(12) United States Patent
Pascal et al.

(10) Patent No.: US 10,999,233 B2
(45) Date of Patent: *May 4, 2021

(54) SCALABLE MESSAGE FIDELITY

(71) Applicant: RCS IP, LLC, Waco, TX (US)

(72) Inventors: Kristin Marie Pascal, Kirkland, WA (US); Andrew Evan Klonsky, Portland, OR (US); Matthew James Bailey, Seattle, WA (US)

(73) Assignee: RCS IP, LLC, Waco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/858,379

(22) Filed: Apr. 24, 2020

(65) Prior Publication Data

US 2020/0358736 A1 Nov. 12, 2020

Related U.S. Application Data

(63) Continuation of application No. 16/356,202, filed on Mar. 18, 2019, now abandoned, which is a
(Continued)

(51) Int. Cl.
*H04L 12/58* (2006.01)
*H04W 4/12* (2009.01)
(Continued)

(52) U.S. Cl.
CPC .............. *H04L 51/24* (2013.01); *G10L 13/08* (2013.01); *G10L 15/26* (2013.01); *H04L 51/063* (2013.01);
(Continued)

(58) Field of Classification Search
CPC ....... H04L 51/24; H04L 51/063; H04L 51/10; H04L 51/38; H04L 51/34; H04L 51/066;
(Continued)

(56) References Cited

U.S. PATENT DOCUMENTS

| 3,576,951 A | 5/1971 | Uchida et al. |
| 4,471,379 A | 9/1984 | Stephens |

(Continued)

FOREIGN PATENT DOCUMENTS

| EP | 0 355 697 | 3/1995 |
| EP | 0 982 732 | 3/2000 |

(Continued)

OTHER PUBLICATIONS

A Comparison of Application Sharing Mechanism in Real-time Desktop Conference Systems by S.R. Ahuja, AT&T Bell Lab Holmdel, NJ 07733.
(Continued)

*Primary Examiner* — Nizar N Sivji
(74) *Attorney, Agent, or Firm* — Knobbe, Martens, Olson & Bear, LLP

(57) ABSTRACT

Message content is scaled to support rich messaging. Devices and associated messaging systems can support various levels of content richness or fidelity. Message content scaling is employed to ensure sharing of content in as rich a manner as possible given limitations associated with various messaging systems, among other things. Messages can be scaled down or degraded, for instance where communicating devices do not support high fidelity content being transmitted. Alternatively, messages can be scaled up or enriched in cases, where low fidelity content is transmitted to a device supporting richer content, for example.

20 Claims, 13 Drawing Sheets

Related U.S. Application Data continuation of application No. 15/147,837, filed on May 5, 2016, now Pat. No. 10,257,148, which is a continuation of application No. 14/698,801, filed on Apr. 28, 2015, now Pat. No. 9,356,900, which is a continuation of application No. 14/193,753, filed on Feb. 28, 2014, now Pat. No. 9,049,163, which is a continuation of application No. 12/342,838, filed on Dec. 23, 2008, now Pat. No. 8,700,072.

(51) Int. Cl.
| | |
|---|---|
| *H04N 19/40* | (2014.01) |
| *G10L 15/26* | (2006.01) |
| *G10L 13/08* | (2013.01) |
| *H04W 4/14* | (2009.01) |
| *H04L 29/08* | (2006.01) |

(52) U.S. Cl.
CPC ............ *H04L 51/066* (2013.01); *H04L 51/10* (2013.01); *H04L 51/34* (2013.01); *H04L 51/38* (2013.01); *H04N 19/40* (2014.11); *H04W 4/12* (2013.01); *H04L 67/02* (2013.01); *H04W 4/14* (2013.01)

(58) Field of Classification Search
CPC ......... H04L 67/02; H04N 19/40; G10L 13/08; G10L 15/26; H04W 4/12; H04W 4/14
See application file for complete search history.

(56) References Cited

U.S. PATENT DOCUMENTS

| | | |
|---|---|---|
| 4,667,088 A | 5/1987 | Kramer et al. |
| 4,710,981 A | 12/1987 | Sanchez |
| 4,796,220 A | 1/1989 | Wolfe |
| 4,949,187 A | 8/1990 | Cohen |
| 5,132,992 A | 7/1992 | Yurt et al. |
| 5,231,511 A | 7/1993 | Kodama et al. |
| 5,347,632 A | 9/1994 | Filepp et al. |
| 5,371,532 A | 12/1994 | Gelman et al. |
| 5,397,988 A | 3/1995 | Schmalbein et al. |
| 5,426,427 A | 6/1995 | Chinnock et al. |
| 5,475,758 A | 12/1995 | Kikuchi |
| 5,550,735 A | 8/1996 | Slade et al. |
| 5,550,976 A | 8/1996 | Henderson et al. |
| 5,557,541 A | 9/1996 | Schulhof et al. |
| 5,600,364 A | 2/1997 | Hendricks et al. |
| 5,613,092 A | 3/1997 | Lim et al. |
| 5,631,850 A | 5/1997 | Tanaka et al. |
| 5,636,276 A | 6/1997 | Brugger |
| 5,638,443 A | 6/1997 | Stefik et al. |
| 5,649,013 A | 7/1997 | Stuckey et al. |
| 5,649,050 A | 7/1997 | Hardwick |
| 5,659,350 A | 8/1997 | Hendricks et al. |
| 5,666,411 A | 9/1997 | McCarty |
| 5,682,195 A | 10/1997 | Hendricks et al. |
| 5,682,460 A | 10/1997 | Hyziak et al. |
| 5,691,494 A | 11/1997 | Sai et al. |
| 5,691,964 A | 11/1997 | Niederlein et al. |
| 5,710,922 A | 1/1998 | Alley et al. |
| 5,715,403 A | 2/1998 | Stefik |
| 5,728,960 A | 3/1998 | Sitrick |
| 5,734,719 A | 3/1998 | Tsevdos et al. |
| 5,734,823 A | 3/1998 | Saigh et al. |
| 5,734,853 A | 3/1998 | Hendricks et al. |
| 5,734,961 A | 3/1998 | Castille |
| 5,737,538 A | 4/1998 | Wilhite |
| 5,740,361 A | 4/1998 | Brown |
| 5,740,549 A | 4/1998 | Reilly et al. |
| 5,748,956 A | 5/1998 | Lafer et al. |
| 5,751,672 A | 5/1998 | Yankowski |
| 5,754,306 A | 5/1998 | Taylor et al. |
| 5,758,257 A | 5/1998 | Herz et al. |
| 5,790,423 A | 8/1998 | Lau et al. |
| 5,793,365 A | 8/1998 | Tang et al. |
| 5,798,785 A | 8/1998 | Hendricks et al. |
| 5,802,518 A | 9/1998 | Karaev et al. |
| 5,809,145 A | 9/1998 | Slik et al. |
| 5,819,036 A | 10/1998 | Adams et al. |
| 5,828,837 A | 10/1998 | Eikeland |
| 5,835,721 A | 11/1998 | Donahue et al. |
| 5,852,657 A | 12/1998 | Malik et al. |
| 5,859,898 A | 1/1999 | Checco |
| 5,862,325 A | 1/1999 | Reed et al. |
| 5,864,620 A | 1/1999 | Pettitt |
| 5,880,731 A | 3/1999 | Liles |
| 5,892,508 A | 4/1999 | Howe et al. |
| 5,894,305 A | 4/1999 | Needham |
| 5,926,624 A | 7/1999 | Katz et al. |
| 5,940,504 A | 8/1999 | Griswold |
| 5,943,679 A | 8/1999 | Niles et al. |
| 5,953,757 A | 9/1999 | Blanks |
| 5,956,716 A | 9/1999 | Kenner et al. |
| 5,983,265 A | 11/1999 | Martino, II |
| 5,990,927 A | 11/1999 | Hendricks et al. |
| 6,006,274 A | 12/1999 | Hawkins et al. |
| 6,014,651 A | 1/2000 | Crawford |
| 6,035,336 A | 3/2000 | Lu et al. |
| 6,047,327 A | 4/2000 | Tso et al. |
| 6,049,670 A | 4/2000 | Okada et al. |
| 6,057,966 A | 5/2000 | Carroll et al. |
| 6,061,659 A | 5/2000 | Murray |
| 6,091,956 A | 7/2000 | Hollenberg |
| 6,097,793 A | 8/2000 | Jandel |
| 6,167,441 A | 12/2000 | Himmel |
| 6,177,931 B1 | 1/2001 | Alexander |
| 6,181,336 B1 | 1/2001 | Chiu et al. |
| 6,199,077 B1 | 3/2001 | Inala et al. |
| 6,212,550 B1 | 4/2001 | Segur |
| 6,226,617 B1 | 5/2001 | Downs |
| 6,226,618 B1 | 5/2001 | Downs et al. |
| 6,253,193 B1 | 6/2001 | Ginter et al. |
| 6,255,647 B1 | 7/2001 | Vanier et al. |
| 6,256,623 B1 | 7/2001 | Jones |
| 6,259,471 B1 | 7/2001 | Peters et al. |
| 6,265,945 B1 | 7/2001 | Delaney et al. |
| 6,292,827 B1 | 9/2001 | Raz |
| 6,311,221 B1 | 10/2001 | Raz et al. |
| 6,330,675 B1 | 12/2001 | Wiser et al. |
| 6,345,256 B1 | 2/2002 | Milsted et al. |
| 6,345,293 B1 | 2/2002 | Chaddha |
| 6,362,856 B1 | 3/2002 | Guzik et al. |
| 6,366,907 B1 | 4/2002 | Fanning et al. |
| 6,377,228 B1 | 4/2002 | Jenkin et al. |
| 6,385,596 B1 | 5/2002 | Wiser et al. |
| 6,388,957 B2 | 5/2002 | Yankowski |
| 6,389,471 B1 | 5/2002 | Agraharam et al. |
| 6,400,958 B1 | 6/2002 | Isomursu et al. |
| 6,408,128 B1 | 6/2002 | Abecassis |
| 6,426,679 B1 | 7/2002 | Oblak et al. |
| 6,434,604 B1 | 8/2002 | Harada |
| 6,438,235 B2 | 8/2002 | Sims, III |
| 6,446,080 B1 | 9/2002 | Van Ryzin et al. |
| 6,452,609 B1 | 9/2002 | Katinsky et al. |
| 6,456,854 B1 | 9/2002 | Chern et al. |
| 6,507,643 B1 | 1/2003 | Groner |
| 6,516,337 B1 | 2/2003 | Tripp et al. |
| 6,529,864 B1 | 3/2003 | Chase |
| 6,545,687 B2 | 4/2003 | Scott et al. |
| 6,553,178 B2 | 4/2003 | Abecassis |
| 6,557,041 B2 | 4/2003 | Mallart |
| 6,567,846 B1 | 5/2003 | Garg et al. |
| 6,567,847 B1 | 5/2003 | Inoue |
| 6,598,230 B1 | 7/2003 | Ballhorn |
| 6,631,359 B1 | 10/2003 | Braitberg et al. |
| 6,643,669 B1 | 11/2003 | Novak et al. |
| 6,731,688 B1 | 5/2004 | Johnson |
| 6,771,975 B1 | 8/2004 | Shin |
| 6,865,599 B2 | 3/2005 | Zhang |
| 6,879,997 B1 | 4/2005 | Ketola et al. |
| 6,882,979 B1 | 4/2005 | Reay et al. |
| 6,907,239 B1 | 6/2005 | Sivula |
| 6,915,265 B1 | 7/2005 | Johnson |

(56) References Cited

U.S. PATENT DOCUMENTS

| | | |
|---|---|---|
| 6,963,920 B1 | 11/2005 | Hohmann et al. |
| 6,965,770 B2 | 11/2005 | Walsh et al. |
| 6,973,662 B1 | 12/2005 | Sie et al. |
| 6,983,480 B1 | 1/2006 | Sie et al. |
| 6,996,393 B2 | 2/2006 | Pyhalammi et al. |
| 7,020,685 B1 | 3/2006 | Chen et al. |
| 7,020,704 B1 | 3/2006 | Lipscomb et al. |
| 7,024,679 B1 | 4/2006 | Sie et al. |
| 7,043,238 B2 | 5/2006 | Ahn et al. |
| 7,047,241 B1 | 5/2006 | Erickson |
| 7,062,255 B2 | 6/2006 | Nakanaga |
| 7,069,575 B1 | 6/2006 | Goode et al. |
| 7,086,005 B1 | 8/2006 | Matsuda |
| 7,116,995 B2 | 10/2006 | Savinen et al. |
| 7,117,256 B1 | 10/2006 | Blinn |
| 7,124,149 B2 | 10/2006 | Smith et al. |
| 7,124,164 B1 | 10/2006 | Chemtob |
| 7,127,232 B2 | 10/2006 | O'Neil et al. |
| 7,164,937 B2 | 1/2007 | Schnurr |
| 7,165,224 B2 | 1/2007 | Pyhalannnni |
| 7,167,710 B2 | 1/2007 | Thakkar et al. |
| 7,200,680 B2 | 4/2007 | Evans et al. |
| 7,206,806 B2 | 4/2007 | Pineau |
| 7,209,892 B1 | 4/2007 | Galuten et al. |
| 7,216,109 B1 | 5/2007 | Donner |
| 7,218,943 B2 | 5/2007 | Klassen |
| 7,228,559 B1 | 6/2007 | Sie et al. |
| 7,240,359 B1 | 7/2007 | Sie et al. |
| 7,272,637 B1 | 9/2007 | Himmelstein |
| 7,277,733 B2 | 10/2007 | Ko et al. |
| 7,308,462 B1 | 12/2007 | Clarkson et al. |
| 7,317,908 B1 | 1/2008 | Eason |
| 7,343,168 B2 | 3/2008 | Valloppillil |
| 7,343,414 B2 | 3/2008 | Lipscomb et al. |
| 7,343,561 B1 | 3/2008 | Stochosky et al. |
| 7,346,687 B2 | 3/2008 | Lipscomb et al. |
| 7,353,466 B2 | 4/2008 | Crane et al. |
| 7,369,868 B2 | 5/2008 | Dunko et al. |
| 7,370,077 B2 | 5/2008 | Pradhan et al. |
| 7,386,799 B1 | 6/2008 | Clanton |
| 7,386,801 B1 | 6/2008 | Horvitz et al. |
| 7,392,288 B2 | 6/2008 | Kanagawa |
| 7,421,690 B2 | 9/2008 | Forstall |
| 7,519,720 B2 | 4/2009 | Fishman et al. |
| 7,536,650 B1 | 5/2009 | Robertson et al. |
| 7,546,537 B2 | 6/2009 | Crawford |
| 7,558,586 B2 | 7/2009 | Klassen et al. |
| 7,571,495 B2 | 8/2009 | Emeth |
| 7,584,225 B2 | 9/2009 | Jiang et al. |
| 7,590,681 B1 | 9/2009 | Chang et al. |
| 7,629,765 B2 | 12/2009 | Chen et al. |
| 7,653,001 B2 | 1/2010 | Argrawal et al. |
| 7,680,809 B2 | 3/2010 | Deng et al. |
| 7,761,507 B2 | 7/2010 | Herf et al. |
| 7,849,135 B2 | 12/2010 | Agrawal et al. |
| 7,864,163 B2 | 1/2011 | Ording et al. |
| 7,881,656 B2 | 2/2011 | Khedouri et al. |
| 7,885,641 B2 | 2/2011 | Tysowski |
| 7,908,325 B1 | 3/2011 | Pabla et al. |
| 8,000,729 B1 | 8/2011 | Jones |
| 8,009,921 B2 | 8/2011 | Csurka |
| 8,020,105 B1 | 9/2011 | Lemay et al. |
| 8,032,597 B2 | 10/2011 | Khoo |
| 8,122,047 B2 | 2/2012 | Kanigsberg et al. |
| 8,175,977 B2 | 5/2012 | Story et al. |
| 8,260,367 B2 | 9/2012 | Chan |
| 8,285,643 B2 | 10/2012 | Isaacson et al. |
| 8,296,434 B1 | 10/2012 | Miller et al. |
| 8,428,626 B2 | 4/2013 | Pascal et al. |
| 8,463,674 B2 | 6/2013 | Hurst |
| 8,510,655 B2 | 8/2013 | Lee et al. |
| 8,521,629 B2 | 8/2013 | Abifaker |
| 8,566,403 B2 | 10/2013 | Pascal et al. |
| 8,577,715 B2 | 11/2013 | Ranta |
| 8,589,267 B2 | 11/2013 | Hurst |
| 8,615,262 B2 | 12/2013 | Pascal et al. |
| 8,661,046 B2 | 2/2014 | King et al. |
| 8,700,072 B2 | 4/2014 | Pascal et al. |
| 8,799,820 B2 | 8/2014 | Pascal et al. |
| 8,825,770 B1 | 9/2014 | Jablokov et al. |
| 8,893,040 B2 | 11/2014 | Pascal et al. |
| 9,049,163 B2 | 6/2015 | Pascal et al. |
| 9,143,809 B2 | 9/2015 | Lipscomb et al. |
| 9,191,786 B2 | 11/2015 | Davis |
| 9,195,996 B1 | 11/2015 | Walsh et al. |
| 9,289,018 B2 | 3/2016 | DeMattei et al. |
| 9,342,040 B2 | 5/2016 | Niikawa et al. |
| 9,342,225 B2 | 5/2016 | Pascal et al. |
| 9,356,900 B2 | 5/2016 | Pascal et al. |
| 9,414,208 B2 | 8/2016 | Davis |
| 9,424,334 B2 | 8/2016 | DeMattei |
| 9,589,013 B2 | 3/2017 | Pascal et al. |
| 9,639,861 B2 | 5/2017 | DeMattei |
| 9,674,120 B2 | 6/2017 | Davis |
| 9,766,784 B2 | 9/2017 | Pascal et al. |
| 10,222,945 B2 | 3/2019 | Pascal et al. |
| 10,313,279 B2 | 6/2019 | DeMattei |
| 2001/0028369 A1 | 10/2001 | Gallo et al. |
| 2001/0043164 A1 | 11/2001 | Thagard et al. |
| 2001/0048738 A1 | 12/2001 | Baniak et al. |
| 2001/0052001 A1 | 12/2001 | Stern et al. |
| 2002/0000998 A1 | 1/2002 | Scott et al. |
| 2002/0026442 A1 | 2/2002 | Lipscomb et al. |
| 2002/0026500 A1 | 2/2002 | Kanefsky et al. |
| 2002/0046181 A1 | 4/2002 | Story et al. |
| 2002/0054164 A1 | 5/2002 | Uemura |
| 2002/0054174 A1 | 5/2002 | Abbott et al. |
| 2002/0055934 A1 | 5/2002 | Libscomb et al. |
| 2002/0073149 A1 | 6/2002 | Young |
| 2002/0095510 A1 | 7/2002 | Sie et al. |
| 2002/0107982 A1 | 8/2002 | Teodosiu et al. |
| 2002/0130904 A1 | 9/2002 | Becker et al. |
| 2002/0137507 A1 | 9/2002 | Winkler |
| 2002/0177454 A1 | 11/2002 | Karri et al. |
| 2003/0009694 A1 | 1/2003 | Wenocur et al. |
| 2003/0026432 A1 | 2/2003 | Woodward |
| 2003/0030839 A1 | 2/2003 | Walters et al. |
| 2003/0040327 A1 | 2/2003 | Park |
| 2003/0041110 A1 | 2/2003 | Wenocur et al. |
| 2003/0087648 A1 | 5/2003 | Wezhvinsky et al. |
| 2003/0091016 A1 | 5/2003 | Ko et al. |
| 2003/0100322 A1 | 5/2003 | Jeon |
| 2003/0101235 A1 | 5/2003 | Zhang |
| 2003/0103607 A1 | 6/2003 | Feakes |
| 2003/0107580 A1 | 6/2003 | Egawa et al. |
| 2003/0109247 A1 | 6/2003 | Lindgren et al. |
| 2003/0149802 A1 | 8/2003 | Curry et al. |
| 2003/0182242 A1 | 9/2003 | Scott et al. |
| 2003/0186680 A1 | 10/2003 | Bhasin et al. |
| 2003/0191709 A1 | 10/2003 | Elston et al. |
| 2003/0191816 A1 | 10/2003 | Landress et al. |
| 2003/0217159 A1 | 11/2003 | Schramm-Apple et al. |
| 2003/0220835 A1 | 11/2003 | Barnes, Jr. |
| 2003/0228909 A1 | 12/2003 | Tanaka |
| 2004/0012569 A1 | 1/2004 | Hara |
| 2004/0015548 A1 | 1/2004 | Lee |
| 2004/0039781 A1 | 2/2004 | LaVallee et al. |
| 2004/0073691 A1 | 4/2004 | Sun |
| 2004/0087326 A1 | 5/2004 | Dunko et al. |
| 2004/0117367 A1 | 6/2004 | Smith |
| 2004/0132431 A1 | 7/2004 | Vandermeijden et al. |
| 2004/0138943 A1 | 7/2004 | Silvernail |
| 2004/0139163 A1 | 7/2004 | Adams et al. |
| 2004/0143667 A1 | 7/2004 | Jerome |
| 2004/0148351 A1 | 7/2004 | Cotte |
| 2004/0148400 A1 | 7/2004 | Mostafa |
| 2004/0176067 A1 | 9/2004 | Lakhani et al. |
| 2004/0186883 A1 | 9/2004 | Nyman et al. |
| 2004/0193691 A1 | 9/2004 | Chang |
| 2004/0224723 A1 | 11/2004 | Farcasiu |
| 2004/0229656 A1 | 11/2004 | Takahashi et al. |
| 2004/0260756 A1 | 12/2004 | Forstall |
| 2005/0004985 A1 | 1/2005 | Stochosky |
| 2005/0004995 A1 | 1/2005 | Stochosky |

(56) References Cited

U.S. PATENT DOCUMENTS

| | | |
|---|---|---|
| 2005/0015443 A1 | 1/2005 | Levine et al. |
| 2005/0021624 A1 | 1/2005 | Herf et al. |
| 2005/0031106 A1 | 2/2005 | Henderson |
| 2005/0037815 A1 | 2/2005 | Besharat et al. |
| 2005/0038863 A1 | 2/2005 | Onyon et al. |
| 2005/0080866 A1 | 4/2005 | Kent et al. |
| 2005/0102308 A1 | 5/2005 | Sykes et al. |
| 2005/0102361 A1 | 5/2005 | Winjum et al. |
| 2005/0111174 A1 | 5/2005 | Jordan |
| 2005/0137984 A1 | 6/2005 | Nguyen et al. |
| 2005/0138193 A1 | 6/2005 | Encarnacion et al. |
| 2005/0144251 A1 | 6/2005 | Slate |
| 2005/0160001 A1 | 7/2005 | Lapre et al. |
| 2005/0175021 A1 | 8/2005 | Ozugur et al. |
| 2005/0188450 A1 | 9/2005 | Clark |
| 2005/0204309 A1 | 9/2005 | Szeto |
| 2005/0209868 A1 | 9/2005 | Wan et al. |
| 2005/0216568 A1 | 9/2005 | Walkush et al. |
| 2005/0227678 A1 | 10/2005 | Agrawal et al. |
| 2005/0229118 A1 | 10/2005 | Chiu et al. |
| 2005/0234904 A1 | 10/2005 | Brill et al. |
| 2005/0246193 A1 | 11/2005 | Roever et al. |
| 2005/0256929 A1 | 11/2005 | Bartol et al. |
| 2005/0264543 A1 | 12/2005 | Gorischek |
| 2005/0266835 A1 | 12/2005 | Agrawal et al. |
| 2005/0273730 A1 | 12/2005 | Card |
| 2006/0003779 A1 | 1/2006 | Lekutai |
| 2006/0014490 A1 | 1/2006 | Kopra et al. |
| 2006/0014523 A1 | 1/2006 | Reilly |
| 2006/0026534 A1 | 2/2006 | Ruthfield et al. |
| 2006/0031257 A1 | 2/2006 | Lipscomb et al. |
| 2006/0041848 A1 | 3/2006 | Lira |
| 2006/0052091 A1 | 3/2006 | Onyon et al. |
| 2006/0053386 A1 | 3/2006 | Kuhl et al. |
| 2006/0059160 A1 | 3/2006 | Smola et al. |
| 2006/0059600 A1 | 3/2006 | Emeth |
| 2006/0066639 A1 | 3/2006 | Iwaki |
| 2006/0069728 A1 | 3/2006 | McEvilly et al. |
| 2006/0078112 A1 | 4/2006 | Meyers |
| 2006/0085392 A1 | 4/2006 | Wang et al. |
| 2006/0085515 A1 | 4/2006 | Kurtz et al. |
| 2006/0095502 A1 | 5/2006 | Lewis et al. |
| 2006/0116167 A1 | 6/2006 | Raviv et al. |
| 2006/0160576 A1 | 7/2006 | Matsuoka |
| 2006/0167992 A1 | 7/2006 | Cheung et al. |
| 2006/0168004 A1 | 7/2006 | Choe et al. |
| 2006/0168054 A1 | 7/2006 | Burkhart et al. |
| 2006/0168095 A1 | 7/2006 | Sharma et al. |
| 2006/0184609 A1 | 8/2006 | Deng |
| 2006/0195429 A1 | 8/2006 | Arrouye et al. |
| 2006/0195506 A1 | 8/2006 | Deng |
| 2006/0206492 A1 | 9/2006 | Lipscomb et al. |
| 2006/0206493 A1 | 9/2006 | Lipscomb et al. |
| 2006/0241792 A1 | 10/2006 | Pretlove et al. |
| 2006/0242306 A1 | 10/2006 | Boro et al. |
| 2006/0277271 A1 | 12/2006 | Morse |
| 2006/0291455 A1 | 12/2006 | Katz et al. |
| 2007/0005511 A1 | 1/2007 | Martinez |
| 2007/0027921 A1 | 2/2007 | Alvarado et al. |
| 2007/0047697 A1 | 3/2007 | Drewry et al. |
| 2007/0049256 A1 | 3/2007 | Wassingbo |
| 2007/0050510 A1 | 3/2007 | Jiang |
| 2007/0073517 A1 | 3/2007 | Panje |
| 2007/0073690 A1 | 3/2007 | Boal et al. |
| 2007/0073776 A1 | 3/2007 | Kalalian et al. |
| 2007/0083408 A1 | 4/2007 | Altberg et al. |
| 2007/0083911 A1 | 4/2007 | Madden et al. |
| 2007/0106739 A1 | 5/2007 | Clark et al. |
| 2007/0128899 A1 | 6/2007 | Mayer |
| 2007/0136668 A1 | 6/2007 | Chen et al. |
| 2007/0150941 A1 | 6/2007 | Jachner |
| 2007/0152979 A1 | 7/2007 | Jobs |
| 2007/0156910 A1 | 7/2007 | Christie |
| 2007/0171830 A1 | 7/2007 | Vulkan et al. |
| 2007/0185961 A1 | 8/2007 | Perlow et al. |
| 2007/0186186 A1 | 8/2007 | Both et al. |
| 2007/0205745 A1 | 9/2007 | Chen et al. |
| 2007/0240193 A1 | 10/2007 | Sie et al. |
| 2007/0242656 A1 | 10/2007 | Klassen et al. |
| 2007/0248055 A1 | 10/2007 | Jain et al. |
| 2007/0249385 A1 | 10/2007 | Doi et al. |
| 2007/0274400 A1 | 11/2007 | Murai et al. |
| 2007/0283247 A1 | 12/2007 | Brenneman et al. |
| 2007/0288860 A1 | 12/2007 | Ording et al. |
| 2008/0004073 A1 | 1/2008 | John et al. |
| 2008/0004951 A1 | 1/2008 | Huang et al. |
| 2008/0005240 A1 | 1/2008 | Knighton et al. |
| 2008/0014989 A1 | 1/2008 | Sandegard et al. |
| 2008/0032703 A1 | 2/2008 | Krumm et al. |
| 2008/0034037 A1 | 2/2008 | Ciudad |
| 2008/0034038 A1 | 2/2008 | Ciudad |
| 2008/0034315 A1 | 2/2008 | Langoulant |
| 2008/0039051 A1 | 2/2008 | Stalin et al. |
| 2008/0055269 A1 | 3/2008 | Lemay |
| 2008/0057926 A1 | 3/2008 | Forstall et al. |
| 2008/0094368 A1 | 4/2008 | Ording |
| 2008/0094369 A1 | 4/2008 | Ganatra |
| 2008/0109741 A1 | 5/2008 | Messing et al. |
| 2008/0119235 A1 | 5/2008 | Nielsen et al. |
| 2008/0133742 A1 | 6/2008 | Southiere et al. |
| 2008/0140338 A1 | 6/2008 | No et al. |
| 2008/0141128 A1 | 6/2008 | Takahashi et al. |
| 2008/0141150 A1 | 6/2008 | Kalaboukis et al. |
| 2008/0153468 A1 | 6/2008 | Reilly |
| 2008/0165148 A1 | 7/2008 | Williamson |
| 2008/0180352 A1 | 7/2008 | Modir et al. |
| 2008/0212944 A1 | 9/2008 | Khedouri et al. |
| 2008/0222710 A1 | 9/2008 | Blagsvedt et al. |
| 2008/0235083 A2 | 9/2008 | Bosarge et al. |
| 2008/0235573 A1 | 9/2008 | Serdy et al. |
| 2008/0256107 A1 | 10/2008 | Banga et al. |
| 2008/0270556 A1 | 10/2008 | Bamford et al. |
| 2008/0299960 A1 | 12/2008 | Lockhart et al. |
| 2008/0307322 A1 | 12/2008 | Stochosky et al. |
| 2008/0311935 A1 | 12/2008 | Tysowski |
| 2008/0313182 A1 | 12/2008 | Vasa |
| 2008/0313341 A1 | 12/2008 | Archer et al. |
| 2008/0319818 A1 | 12/2008 | Gurdin et al. |
| 2009/0013048 A1 | 1/2009 | Partaker et al. |
| 2009/0013265 A1 | 1/2009 | Cole et al. |
| 2009/0030991 A1 | 1/2009 | Vakkalanka |
| 2009/0031015 A1 | 1/2009 | Morgan et al. |
| 2009/0042622 A1 | 2/2009 | Tsui et al. |
| 2009/0053995 A1 | 2/2009 | Moore, III |
| 2009/0055369 A1 | 2/2009 | Phillips et al. |
| 2009/0063557 A1 | 3/2009 | MacPherson |
| 2009/0073888 A1 | 3/2009 | Gollapudi et al. |
| 2009/0077027 A1 | 3/2009 | King |
| 2009/0103899 A1 | 4/2009 | Lessing |
| 2009/0113315 A1 | 4/2009 | Fisher et al. |
| 2009/0117922 A1 | 5/2009 | Bell et al. |
| 2009/0126243 A1 | 5/2009 | Schellingerhout et al. |
| 2009/0128530 A1 | 5/2009 | Ek |
| 2009/0129278 A1 | 5/2009 | Kumar et al. |
| 2009/0156172 A1 | 6/2009 | Chan |
| 2009/0179074 A1 | 7/2009 | Hurst |
| 2009/0182663 A1 | 7/2009 | Hurst |
| 2009/0191904 A1 | 7/2009 | Hronek et al. |
| 2009/0210318 A1 | 8/2009 | Abifaker |
| 2009/0210778 A1 | 8/2009 | Kulas et al. |
| 2009/0234784 A1 | 9/2009 | Buriano et al. |
| 2009/0274384 A1 | 11/2009 | Jakobovits |
| 2009/0310290 A1 | 12/2009 | Tennent |
| 2009/0313341 A1 | 12/2009 | Leinfellner et al. |
| 2009/0320077 A1 | 12/2009 | Gazdzinski |
| 2009/0327065 A1 | 12/2009 | Mayblum |
| 2009/0327267 A1 | 12/2009 | Wong et al. |
| 2010/0004977 A1 | 1/2010 | Marci et al. |
| 2010/0011021 A1 | 1/2010 | Varadarajan et al. |
| 2010/0013628 A1 | 1/2010 | Monroe |
| 2010/0036717 A1 | 2/2010 | Trest |
| 2010/0036918 A1 | 2/2010 | Gupta |
| 2010/0051689 A1 | 3/2010 | Diamond |
| 2010/0058200 A1 | 3/2010 | Jablokov et al. |

(56) References Cited

U.S. PATENT DOCUMENTS

| | | |
|---|---|---|
| 2010/0062796 A1 | 3/2010 | Hayton et al. |
| 2010/0071013 A1 | 3/2010 | Vandermolen et al. |
| 2010/0082757 A1 | 4/2010 | King et al. |
| 2010/0100839 A1 | 4/2010 | Tseng et al. |
| 2010/0106795 A1 | 4/2010 | Alberth, Jr. et al. |
| 2010/0114887 A1 | 5/2010 | Conway et al. |
| 2010/0124913 A1 | 5/2010 | Cox |
| 2010/0138756 A1 | 6/2010 | Saund et al. |
| 2010/0158097 A1 | 6/2010 | Pascal et al. |
| 2010/0159883 A1 | 6/2010 | Pascal et al. |
| 2010/0159944 A1 | 6/2010 | Pascal et al. |
| 2010/0159965 A1 | 6/2010 | Pascal et al. |
| 2010/0162133 A1 | 6/2010 | Pascal et al. |
| 2010/0162138 A1 | 6/2010 | Pascal et al. |
| 2010/0162166 A1 | 6/2010 | Pascal et al. |
| 2010/0169441 A1 | 7/2010 | Lafleur et al. |
| 2010/0198931 A1 | 8/2010 | Pocklington et al. |
| 2010/0223095 A1 | 9/2010 | Ranta |
| 2010/0269138 A1 | 10/2010 | Krikorian et al. |
| 2010/0275224 A1 | 10/2010 | Sheng et al. |
| 2010/0275267 A1 | 10/2010 | Walker et al. |
| 2010/0291907 A1 | 11/2010 | MacNaughtan et al. |
| 2010/0318423 A1 | 12/2010 | Kanigsberg et al. |
| 2011/0029373 A1 | 2/2011 | Steelberg et al. |
| 2011/0035452 A1 | 2/2011 | Gittleman |
| 2011/0060609 A1 | 3/2011 | Meers et al. |
| 2011/0106698 A1 | 5/2011 | Isaacson et al. |
| 2011/0202615 A1 | 8/2011 | Fletcher |
| 2011/0225539 A1 | 9/2011 | Lee et al. |
| 2012/0021727 A1 | 1/2012 | Kelly |
| 2012/0028718 A1 | 2/2012 | Barclay et al. |
| 2012/0054655 A1 | 3/2012 | Kang et al. |
| 2012/0102091 A1 | 4/2012 | Rao |
| 2012/0144550 A1 | 6/2012 | Nejad |
| 2012/0204307 A1 | 8/2012 | DeMattei et al. |
| 2013/0055099 A1 | 2/2013 | Yao et al. |
| 2013/0055112 A1 | 2/2013 | Joseph et al. |
| 2013/0055113 A1 | 2/2013 | Chazin et al. |
| 2013/0162750 A1 | 6/2013 | Nerst et al. |
| 2013/0166285 A1 | 6/2013 | Chang et al. |
| 2013/0191384 A1 | 7/2013 | DeMattei |
| 2013/0231145 A1 | 9/2013 | Pascal et al. |
| 2013/0267262 A1 | 10/2013 | DeMattei |
| 2014/0004889 A1 | 1/2014 | Davis |
| 2014/0007222 A1 | 1/2014 | Qureshi et al. |
| 2014/0012694 A1 | 1/2014 | Abifaker |
| 2014/0019290 A1 | 1/2014 | Beaver |
| 2014/0025663 A1 | 1/2014 | Pascal et al. |
| 2014/0058447 A1 | 2/2014 | Chervitz et al. |
| 2014/0074923 A1 | 3/2014 | Vasudevan et al. |
| 2014/0181230 A1 | 6/2014 | Pascal et al. |
| 2014/0189608 A1 | 7/2014 | Shuttleworth et al. |
| 2014/0195933 A1 | 7/2014 | Rao Dv |
| 2014/0245170 A1 | 8/2014 | Pascal et al. |
| 2014/0310617 A1 | 10/2014 | Pascal et al. |
| 2014/0379826 A1 | 12/2014 | Hertz et al. |
| 2015/0089392 A1 | 3/2015 | McGuffin et al. |
| 2015/0244666 A1 | 8/2015 | Pascal et al. |
| 2015/0264308 A1 | 9/2015 | Chastney et al. |
| 2015/0324858 A1 | 11/2015 | DeMattei |
| 2015/0358582 A1 | 12/2015 | Zhou et al. |
| 2016/0014094 A1 | 1/2016 | Kurabayashi |
| 2016/0034977 A1 | 2/2016 | Bhaoual et al. |
| 2016/0073241 A1 | 8/2016 | Davis |
| 2016/0246459 A1 | 8/2016 | Pascal et al. |
| 2016/0248715 A1 | 8/2016 | Pascal et al. |
| 2016/0277784 A1 | 9/2016 | DeMattei et al. |
| 2016/0344662 A1 | 11/2016 | Davis |
| 2017/0155602 A1 | 6/2017 | Pascal et al. |
| 2017/0324624 A1 | 11/2017 | Taine et al. |
| 2018/0006974 A1 | 1/2018 | Davis |
| 2018/0077096 A1 | 3/2018 | DeMattei |
| 2019/0124021 A1 | 4/2019 | DeMattei |
| 2020/0034003 A1 | 1/2020 | Pascal |
| 2020/0076747 A1 | 3/2020 | DeMattei |
| 2020/0228472 A1 | 7/2020 | Pascal |
| 2020/0228480 A1 | 7/2020 | DeMattei |

FOREIGN PATENT DOCUMENTS

| | | |
|---|---|---|
| EP | 0 765 062 | 11/2005 |
| JP | H05167590 A | 7/1993 |
| JP | H06169435 A | 6/1994 |
| JP | H06180927 A | 6/1994 |
| JP | H0832892 A | 2/1996 |
| JP | H08167228 A | 6/1996 |
| JP | 2001-032105 | 2/2001 |
| JP | 2001-057599 A | 2/2001 |
| JP | 2004-118737 A | 4/2004 |
| JP | 2009-280946 | 12/2009 |
| KR | 10 2006 0125333 A | 12/2006 |
| KR | 10 2008 0078431 | 8/2008 |
| WO | WO 1996/027155 | 9/1996 |
| WO | WO 1999/013417 | 3/1999 |
| WO | WO 1999/027681 | 6/1999 |
| WO | WO 2001/022730 | 3/2001 |
| WO | WO 2001/025948 | 4/2001 |
| WO | WO 2001/027773 | 4/2001 |
| WO | WO 2001/053963 | 7/2001 |
| WO | WO 2001/072460 | 10/2001 |
| WO | WO 2005/067327 | 7/2005 |
| WO | WO 2012/100082 | 7/2012 |
| WO | WO 2013/090395 | 6/2013 |
| WO | WO 2013/152266 | 10/2013 |

OTHER PUBLICATIONS http://www.boygeniusreport.com/gallery/handsets/beejive-for-iphonel?pid=3076#picture_nav Retrieved Feb. 20, 2009.

Litigation: Law Suit filed by Zapmedia Services, Inc. against Apple, Inc. for the infringement of U.S. Pat. No. 7,020,704 and 7,343,414, filed on Mar. 12, 2008 in the United States District Court for the Eastern district of Texas, Marshall Division.

http://www.swaggle.mobi/sessions/new Retrieved Feb. 20, 2009.

Kurlander, et al. "Comic Chat" Proceeding SIGGRAPH '96, Proceedings of the 23rd annual conference on computer graphics and interactive techniques, Aug. 1996, 12 pages.

"Verizon Lets Users Text Message the Gift of Coffee" by Alyssa Newcomb, Dec. 19, 2014, 2 pages, https://abcnews.go.com/Technology/verizon-lets-users-text-message-gift-coffee/story?id=27717831.

Wikipedia. "Microsoft Comic ChaT", retrieved from [http://en.wikipedia.org/wiki/Microsoft_Comic_Chat] on Mar. 11, 2015, 3 pages.

3COM Corp., Handbook for the Palm III™ Organizer (1998); and Palm, Support Resources for Older PalmProducts, ArticleID: 47831, Dec. 22, 2008.

Atlanta Business Chronicle, ZapMedia channels TV, music into one, http://atlanta.bizjournals.com/atlanta/stories/2000/05/22/focus 14.html?t=printable, 1-4, 2000.

Atlanta Business Chronicle, ZapMedia forges alliance with L.A. Internet movie firm, http://atlanta.bizjournals.com/atlanta stories/2000/08/28/daily4.htnnl, 1-2, 2000.

Bainbridge, et al., "Towards a Digital Library of Popular Music," ACM, at 161-169 (1999).

Device profile: ZapMedia ZapStation. http://www.linux devices.com/articles/AT49647 10304.html, 1-2, 2002.

*Playboy Enterprises, Inc.*, Plaintiff vs. *Russ Hardenburgh, Inc.*, Defendant, Case No. 1:93 CV 0546, 982 F.Supp. 503; 1997 U.S. Dist. Lexis 19310, filed Nov. 25, 1997.

HighBeam Research If You Build It, They Will Hum . . . . MP3.Comand Zapmedia Team to Create Personalized Multi Access Digital Music Enfironment, http://www.highbeam.com/DocPrint.aspx?DocId=1G1:66146670, 1-3, 2000.

HighBeam Research 2001 International CES Draws Impressive List of First-Time Exhibitors. http://www.highbeam.com/DocPrint.aspx?DocId=1G1:68319971, 1-3, 2000.

HighBeam Research, Advisory/Top Industry Executives to Keynote Kagan VOD Summit. http://www.highbeam.com/DocPrint.aspx?DocId=1G1:83526049, 1-5, 2002.

(56) References Cited

OTHER PUBLICATIONS

HighBeam Research, ANT Fresco Browser Enables Armchair Internet Access Via Interisa's Digital Set-Top Box; Interisa Now Shipping 15,000 Units a Month. http://www.highbeam.com/DocPrint.aspx?DocId=1G1:77023083, 1-3, 2001.
HighBeam Research, ANT Fresco Browser Ported to STMicroelectronics' OMEGA Family Reference Design Hardware and STAPI Software; Cost-Effective Product Development Made Quicker and Easier With Demonstration Port. http://www.highbeam.com/DocPrint.aspx?DocId=1G1:70432551, 1-3, 2001.
HighBeam Research, ANT Fresco Browser to Enable Internet Browsing Capabilities in ZapMedia's ZapStation Hardware Reference Design; to be Showcased at CES 2001 Booth No. 1781. http://www.highbeam.com/DocFrint.aspx?DocId=1G1:68676688, 1-3, 2001.
HighBeam Research, Building a Business on Betty Boop. http://www.highbeam.com/DocPrint.aspx?DocID=1G1:76995271, 1-3, 2001.
HighBeam Research, Customized Audio/Video Jukebox Brings New Meaning to Home Entertainment. http://www.highbeam.com/DocPrint.aspx?DocId=1G1:80107324, 1-2, 2001.
HighBeam Research, Echelon Showcases Home Networking Technology at Excite(a)Home's Broadband LIVE! Event. http://www.highbeam.com/DocPrint.aspx?DocId=1G1:74508383, 1-2, 2001.
HighBeam Research, Innovations, http://www.highbeam.com/DocBrint.aspx?DocId=1P1:387982.99, 1-5, 2000.
HighBeam Research, InterVideo's LinDVD Selected for ZapStation Universal Media Player Technology Powers DVD Playback in Breakthrough Digital Media Appliance. http://www.highbeam.com/DocPrint.aspx?DocId=1G1:6631845, 1-3, 2000.
HighBeam Research, It's Put Up or Shut Up for ZapMedia. http://www.highbeam.com/DocPrint.aspx?DocId=1GI:81602197. 1-2, 2002.
HighBeam Research, Journey to the center of it all. (Always on). (development of digital video records)(Brief Article) http://www.highbeam.com/DocPrint.aspx?DocId=1G1:839 15664, 1-3, 2002.
HighBeam Research, Kelly's 1. Keeping You Up to Speed on the Net (Features), http://www.highbeam.com/DocPrint.aspx?DocId=1G1:65266879, 1-2, 2000.
HighBeam Research, Max Broadcasting Network and OmniSky Deliver Real Time NFL and MLB Content to Wireless Mobile-Users., http://www.highbeam.com/DocPrint.aspx?DocId=1G1:67679585, 1-3, 2000.
HighBeam Research, MediaX's amuZnet.com Hosts Live Audio Chat With *NSYNC's Chris Kirkpatrick to Discuss New FuMan Skeeto Clothing Lines and Exclusive contest; Fashion Show on the Net to Follow. http://www.highbeam.com/DocPrint.aspx?DocId=1G1:70425066, 1-3, 2001.
HighBeam Research, Really Big Film Corp Retains MediaX to Spearhead Online Marketing Campaign for Giant-Screen Concert Film *NSYNC Bigger Than Live'. http://www.highbeam.com/DocPrint.aspx?DocId=1G1:72669653, 1-3, 2001.
HighBeam Research, Talk about convergence.(Brief Article), http://www.highbeam.com/DocFrint.aspx?DocId=1G1:64258801, I, 2000.
HighBeam Research, Try a New Internet-Enabled Box http://www.highbeam.com/DocPrint.aspx?DocId=1P1:49353006, 1-2, 2002.
HighBeam Research, TV online. A look at how the top station groups are developing their Internet plans, http://www.highbeam.com/DocPrint.aspx?DocId=1G1:6574403, 1-7, 2000.
HighBeam Research, VC Market Shows Faith in ANT to Sum of $3.6 Million; Total Investment in ANT to Date Now S11.9 Million. http://www.highbeam.com/DocPrint.aspx?DocId=1G1:768380 6, 1-2, 2001.
HighBeam Research, Web films could press cable VOD in future. (Broadband Content). http://www.highbeam.com/DocPrint.aspx?DocId=1G1:8019 1602, 1-2, 2001.
HighBeam Research, ZapMedia and EarthLink Sign Broadband Marketing and Distribution Agreement; EarthLink to Become ZapMedia's First Broadband Connectivity Partner. http://www.highbeam.com/DocPrint.aspx?DocId=1G1:68270 131, 1-2, 2000.
HighBeam Research, ZapMedia partners with EarthLink—Atlanta Business Chronicle: http://www.highbeam.com/DocPrint.aspx?DocId=1S1: 12020300014331O1, 1, 2000.
iApplianceweb-OEG, Susan Hospod, ZapStation, http://www.iapplianceweb.com/appreview/audio players 24.html, 1-2.
Jack Lacy, James H. Snyder, & David P. Maher, Music on the Internet and the Intellectual Property Protection Problem. Proceedings of the IEEE International Symposium on Industrial Electronics, vol. 1, SS77-SS83 (1997).
L. Aguilar, J.J. Garcia-Luna-Aceves, D. Moran, E.J. Craighill, & R. Brungardt, Architecture for a Multimedia Teleconferencing System, ACM, 126-136 (1986).
Los Angeles & Atlanta—(Business Wire) ANT Fresco Browser to Enable Internet Browsing Capabilities in ZapMedia's ZapStation Hardware Reference Design; to be Showcased at CES 2001 Booth No. 1781; http://findarticles.com/p/articles/mi moEIN/is 2001 Jan 3/ai 68676688 print, 1-2, 2001.
Slashdot, ZapStation CD/MP3/DVD Player/Server, http://hardware.slashdot.org/article.pl?nod2=1&sid,00/09/22/222322, 1-4, 2000.
Using Subtitles and alternative audio tracks. To use Subtitles and alternative audio tracks: while you're playing a movie in iTunes, choose Controls > Audio & Subtitles > Option). file:///Users/lissy/Docunnents/*Work/iTunes/iT%207.6/iTunesHelp-81.1...es.app/Contents/Resources/English.Iproj/iTunes%20Help pgs/20868.html.
ZapMedia ZapStation/Harman Kardon DMC 100, http://www.linuxjournal.com/articie/4526, 1-3, 2001.
OverYour Cable Channels, Cox Communications Channel Line Up.
Cox Cable vs. Satellite TV Who's the Real Champ.
Inside: How to clean up big time.
What . . . Here's Your Change to Find Out.
Cox Communications is Unveiling Big Things.
Question: What is absolutely clear, totally interactive and over 200?
Introducing COX Wirelink.
Your Cable TV Company is Changing to Cox Communications.
Cox Communications Advertisement Free installation.
Expect. Star Sight.
Join the Revolution.
Cox Digital Channel lineup.
Join the Digital TV Revolution.
It's a Revolution in Digital TV.
www.HolyMoley.com.
It's a Revolution in Digital TV (2).
Join the Digital TV Revolution (2).
Happy Holidays from Cox Communications.
We've got you covered.
We've got a monstrously good time in store for you enter if you dare.
With Cox Digital TV Deluxe Get 8 Channels for the price of HBO.
Simplify you live and take Control.
Same TV new experience.
Articles, documents, advertisements for Time Warner Cable's Full Service Network.
Belles, Gail, "Privacy and Security Protections for Healthcare Information," Computers in Health Care, Computerizing Large Integrated Health Networks, p. 116 (Robert M. Kolodner ed. 1997).
Compuserve Information Manager: The Complete Sourcebook. A Bantam Book, Sep. 1990.
Audible Manager Software User's Guide (1997).
Hughes Network Systems Model. HIRD-D2 Digital Satellite Receiver Owner's Manual (c) 1998.
M. Crispin, Internet Message Access Protocol Version 4, rev. 1 (Dec. 1996).
R. Austein, Synchronnization Operations for Disconnected IMAP4 Clients (Jun. 1994).
Time Warner Cable Full Service Network, "Time Warner Introduces World's First Full Service Network in Orlando" (Dec. 1994).
Time Warner Cable, "Developmentofa Full ServiceNetwork" (Denver, Feb. 11, 1993).
Mario P. Vecchi and Michael Adams of Time Warner Cable, "Traffic Management for Highly Interactive Transactional SYstem" (1995 NCTA Technical Papers).
Jul. 8, 2010 Declaration of Mr. William Overton Gilliam.

(56) References Cited

OTHER PUBLICATIONS

DADpro System Reference Manual Version 24e, 1998 by ENCO Systems.
Audible Inc. Announces Equity Investment by Compaq Computer Corporation, Hambrecht & Quist LLC, Business Wire, Mar. 30. 1998.
Andy Huffman Joins Audible Inc.. As President and CEO, Business Wire, Mar. 30, 1998.
Andy Huffman Joins Audible Inc. as President and CEO, Financial Times Information, Mar. 30, 1998.
Industry Leaders Select Most Innovative and Results-Oriented Uses of the Internet and network Technology, Business Wire, Mar. 10, 1998.
Industry Leaders Select Most Innovative and Results-Oriented Uses of the Internet and network Technology, Financial Times Information, Mar. 10, 1998.
To Business, Technology and Entertainment Editors, PRNewswire Association, Feb. 9, 1998.
Cyberscope SKED, Associated Press, Feb. 6, 1998.
Cyberscope, WorldSources Inc., Feb. 6, 1998.
Realnetworks, M2 Communications, Feb. 3, 1998.
Realnetworks & AUdible Inc. Deliver New Mobile Audio Solution for Corporate Intranets, Financial Times Information, Feb. 3, 1998.
1997 WebAwards Recognizes Award Winning Corporate Web Sites, PR Newswire Association, Feb. 2, 1998.
BroadVision, Inc. Announces Record Fourth Quarter 1997 Results, PR newswire Association, Inc., Jan. 29, 1998.
RealNetworks and Audible Inc. to Deliver New Mobile Audio Solution for Corporate Intranets; RealServer 5.0 to Interoperate with Audible Players; Allows Intranet Users to Access RealAudio for Mobile Play, PRNewswire Association, Jan. 26, 1998.
Audible launches Audible.com Store and Audible Player with special holiday offer, M2 Presswire, Dec. 17, 1997.
Audible Inc. Launces Audible.com Store and Audible Player with Special Holiday Offer. Dec. 16, 1997.
Audible Inc. Launches Audible.com Store Built With BroadVision One-To-One, PR Newswire Association, Dec. 16, 1997.
Business and Financial News, Knight Ridder/Tribune News Service, Dec. 10, 1997, by David Hayes.
Yahoo!, Reuters NewMedia, Morningstar, PR Newswire and Third Age are Among Early Partners to Syndicate Internet Content through the NetFvents(SM) Network, PR Newswire Association, Sep. 17, 1997.
Progressive Networks and Audible Inc. Team up to Make RealAudio Mobile, BusinessWire Inc., Sep. 15, 1997.
Audible to Offer On-Demand Audio Programming Via the Web for Mobile Playback, Business Wire, Jul. 30, 1997.
Audible Inc. S11 filing dated Apr. 26, 1999.
RA Bissell and A Eales, the set-top box for interactive services, BT Technol J vol. 13, No. 4 Oct. 1995.
Expert report of Dr. John P.J. Kelly regarding invalidity of U.S. Pat. No. 7,343,414.
Various screen shots of Audible System to accompany John Kelley Expert Report.
The DigitalNews System at EDUCOM: A convergence of Interactive Computing, Newspapers, Television and High-Speed Networks.
Apple Interactive Television Box, Setting up and using the equipment.
Building Network-based Interactive Media, Dean Blackketter & Greg Gretsch, Apple Computer Inc., 1993 IEEE.
Apple, Inc.'s Invalidity Contentions, Case No. 2:08-CV-104-DF-CE, filed Feb. 13, 2009, incl. Appendices 1-317 (claim charts for cited prior art).
Aesoon Park & Kyunghyu Lee, Software Architecture of Broadband Distribution in the Optical CATV Network, International Conference on Communication Technology Proceedings, vol. 1,234-237 (1996).
Ahmed K. Elmagarmid et al., Video Database Systems: Issues, Products and Applications, 57-119 (1997).

Anna Hac & Dongchen Lu, Architecture, Design, and Implementation of a Multimedia Conference System, International Journal of Network Management, vol. 7, 64-83 (1997).
Apple Computer, Inc., Newton Connection Utilities User's Manual for the Macintosh Operating System (1997).
Apple Computer, Inc., Apple Messagepad Handbook for Newton (1995).
Apple Computer, Inc., Newton Connection Utilities User's Manual for Windows (1997).
Apple Computer, Inc., Newton Press User'S Guide for Windows (1996).
Apple Computer, Inc., Newton Programmers Guide 2.1 OS Addendum (1997).
Apple Computer, Inc., Newton Programmers Reference for Newton 2.0 (1996).
Apple, Computer, Inc., Newton 2.0 User Interface Guidelines (1996).
Apple, Computer, Inc., Newton Backup Utility User'S Guide for the Windows Operating System (1995).
Apple, Computer, Inc., Newton Press User'S Guide for the Macintosh Operating System (1995).
Apple, Inc.'s Supplemental Invalidity Contentions, Case No. 2:08-CV-104-DF-CE, filed Dec. 4, 2009.
Apple's Responsive Markman Brief, (Doc No. 84), Case No. 2:08-CV-00104-DF-CE, Feb. 1, 2010.
Apple's Responses to ZapMedia's First Set of Interrogatories (1-11) and Requests for Production of Documents, Case No. 2:08-CV-I04-DF-CE, Dec. 9, 2008.
Apple's Responses to ZapMedia's Second Set of Interrogatories & Requests for Production of Electronic Documents, Case No. 2:08-CV-IO4-DF-CE, Mar. 30, 2009.
Atlanta Business Chronicle, Buyers rejected media appliance, http://www.bizjournals.com/atlanta/stories/2002/09/02/story8.html?t=printable, 1-3, 2002.
Atlanta Business Chronicle, West Coast firm looking at Zapmedia. http://masshightech.bizjournals.conn/atlanta/stories/2001/07/16/story7.html?t=printable,1-3, 2001.
Atlanta Business Chronicle, ZapMedia channels TV, music into one, littp://atlanta.bizjournals.com/atlanta/stories/2000/05/22/focus 14. html?t=printable, 1-4, 2000.
Atlanta Business Chronicle, ZapMedia partners with EarthLink http://atlanta.bizjournals.com/atlanta/stories/2000/12/18/daily11.html?t=printable, 1, 2000.
Atlanta-Business Wire, ZapMedia Teams Up with Amplified and Muze to Deliver Content and Merchandizing Solutions, http://findarticles.com/p/articles/mi moEIN/is 2000 August 9/ai_63964068/print, 1-2, 2000.
Audible, Inc., Audible Mobileplayer and Mobileplayer Plus User's Guide (1997, 1998); and Audible, Inc. S-1 Registration Statement (Doc No. APPLE0002677), Apr. 26, 1999.
Whyte, Bill: "The Many Dimisions of Multimedia Communications," Multimedia Telecommunications, 1-37, and 74-124 (1997).
Soule, Charles D.: "Computers Law and—Fall 1999," Final Paper, *RIAA v. Napster*: An Analysis, APPLE0001803 (1999).
CNNMoney.com, Fortune: "This Old Data Warehouse Does a house become a home when you put in a rocking chair and Stoke the fire? Maybe in that other millennium. Here in the 21st century, coziness might mean computing at the video-gaming console and rewinding live broadcasts on a Super-sharptelevision," http://money. cnn.com/magazines/fortuneffortune archive/2000/12/01/298207/index.htm, Dec. 1, 2000.
*ZapMedia Services, Inc.* vs. *Apple, Inc.*, Complaint for Patent Infringement, Case No. 2:08-CV-I04, filed Mar. 12, 2008.
Boyarski, Dan: "A Visual Tour of Andrew: Snapshots of the Andrew System, a campus-wide computing network, a joint venture between IBM and Carnegie Mellon University," (Nov. 9, 1989).
Bainbridge, David, et al.: "Towards a Digital Library of Popular Music," ACM, at 161-169 (1999).
Defendant Apple, Inc's Answer, Affirmative Defenses, and Counterclaims to Plaintiffs. Original Complaint, Case No. 2:08-CV-104-DF-CE, Doc No. 14, May 8, 2008.
VA FileMan User Manual: Version 21.0, Dec. 1994, Department of Veterans Affairs, Decentralized Hospital Computer Program.

(56) References Cited

OTHER PUBLICATIONS

Device profile: ZapMedia ZapStation. http://www.linuxdevices.com/articles/AT4964710304.html, (2 pgs.) Mar. 22, 2002.

DVD News: DVDINSIDER: New Groundbreaking Home-Entertainment Convergence Component, http://findarticles.com/p/articles/mi hb5599/is 200012/ai n23585888/print, (1 pg.) Dec. 20, 2000.

Gomez, E.J., et al., "The Bonaparte Telemedicine ATM Multimedia Applications," Lecture Notes in Computer Science, Multimedia Applications, Services and Techniques—ECMAST '97621 (Serge Folida & Michele Morganti eds., May 1997).

Bartlett, E.R.: "Cable Televistion Technology and Operations," Introduction to Cable Television Systems, McGraw-Hill, Inc., 1-10, 1990.

Wilson, Amy: "Zap to It," Fast Company.Com, http://www.fastcompany.com/node/40919/print, (1 pg.) Dec. 19, 2007.

Data Security for Health Care, vol. II: Technical Guidelines, Gerrit Bleumer, Technical Recommendations on Cryptographic Mechanisms for IT and Security Personnel, in (The SEISMED Consortium eds., Technology and Informatics, vol. 32, 1996).

Campbell, Graham M. & Yih-Chen Wang, Dig-Music: An On Demand Digital Musical Selection System Utilizing CATV Facilities, vol. CE-28, Issue 3, Aug. 1982, xviii-xxvi.

Hancocket al., Software Control of Multimedia Device Interconnection, IP.com Prior Art Database, Sep. 1, 1993, pp. 569-572.

HighBeam Research, Advisory/ANT Limited to Present at Internet Device Builders Show. http://www.highbeam.com/DocPrint.aspx?DocID=1G1:74478998, 1-3, May 14, 2001.

HighBeam Research, Advisory/Top Industry Executives to Keynote Kagan VOD Summit. http://www.highbeam.com/DocFrint.aspx?DocId-1G1:83526049, 1-5, Mar. 4, 2002.

HighBeam Research, ANT Fresco browser enables armchair Internet access via Interisa's digital set-top box; Interisa now shipping 15,000 units al month. http://www.highbeam.com/DocFrint.aspx?DocId=1G1:77031250, 1-3, Aug. 7, 2001.

HighBeam Research, ANT Fresco Browser Enables Armchair Internet Access Via Interisa's Digital Set-Top Box; Interisa Now Shipping 15,000 Units a Month. http://www.highbeam.com/DocPrint.aspx?DocId=1G1:77023083, 1-3, Aug. 7, 2001.

HighBeam Research, ANT Fresco browser navigates Europe's first satellite-delivered digital entertainment and communications system for hotels; Quadriga Genesis to rival domestic digital broadcasters in look, feeland functionality. http://www.highbeam.con/DocFrint.aspx?DocId=1G1:78262370, 1-3, Sep. 14, 2001.

HighBeam Research, ANT Fresco Browser Navigates Europe's First Satellite-Delivered Digital Entertainment and Communications System for Hotels. http://www.highbeam.com/DocFrint.aspx?DocId=1G1:78253377, 1-3, Sep. 14, 2001.

HighBeam Research, ANT Fresco Browser Selected by Philips Semiconductors for its Nexperia Silicon System Platforms. http://www.highbeam.com/DocFrint.aspx?DocId=1G1:74793847. 1-3, 2001.

HighBeam Research, ANT Fresco browser to enable Internet browsing capabilities in ZapMedia's ZapStation hardware reference deisgn., http://www.highbeam.com/DocFrint.aspx?DocId=1G1:68738358, 1-3, 2001.

HighBeam Research, ANT Introduces Industry's first "Content-Driven" Embedded Browser, Providing Optimum Real-World Functionality. http://www.highbeam.com/DocFrint. aspx?DocId=1G1:72949631, 1-3, 2001.

HighBeam Research, ANT Limited Demonstrates Range of Internet Appliances Enabled by Fresco Embedded Browser at Ess, London. http://www.highbeam.com/DocFrint. aspx?DocId=1G1:74566040, 1-3,2001.

HighBeam Research, ANT Limited Demonstrates Versatility of Its Fresco Browser in Some of the World's Most Innovative Internet Appliances at ESC West 2001. http://www.highbeam.com/DocFrint.aspx?DocId=1G1:72949627, 1-4, 2001.

HighBeam Research, ANT Limited Expands to New Global HQ in Cambridge UK; Plans to Double its Software Engineering Capability in Six Months. http://www.highbeam.com/DocFrint.aspx?DocId=1G1:7534.3259, 1-2, 2001.

HighBeam Research, ANT Limited Harnesses Power of the Internet for OpenGlobe's New Breed of Multi-Media Home Entertainment Appliances. http://www.highbeam.com/DocFrint.aspx?DocId=1G1:72949630, 1-3, 2001.

HighBeam Research, ANT Limited harnesses power of the Internet for OpenGlobe's new breed of multi-media home entertainment appliances, ANTS Fresco enables browsing capabilities for digital home entertainment devices jointly designed by OpenGlobe and major consumer electronic OEMs. http://www.highbeam.com/ DocPrint.aspx?DocId=1G1:72989766, 1-3, 2001.

HighBeam Research, ANT Limited Officially Opens. Its New Global HQ in Cambridge, U.K., Facility to Accommodate Next Phase of company's Rapid Expansion. http://www.highbeam.com/DocFrint.aspx?DocId=1G1:76405210, 1-2, 2001.

HighBeam Research, ANT Limited to demonstrate its industry leading technology for interactive TV and multimedia broadcasting at IBC: Showcasing products from Quiero TV, Pace MicroTechnology, Alba, IBM, Sagem, Interisa, LSI Logic, Wind River Systems and Amino Communications. http://www.highbeam.com/DocFrint.aspx?DocId=1G1:77622806, 1-3, 2001.

HighBeam Research, ANTLtd. to Demonstrate Its Industry-Leading Technology for Interactive TV and Multimedia Broadcasting at IBC. http://www.highbeam.com/DocFrint.aspx?DocId=1G1:77601401, 1-3, 2001.

HighBeam Research, Cable Timeshifting Opportunities in a Interactive TV World., http://www.highbeam.com/DocFrint. aspx?DocId=1G1:68738800, 1-3, 2000.

HighBeam Research, CES '02 focuses on convergence http://www.highbeam.com/DocPrint.aspx?DocId=1P2:13115264, 1-2, 2002.

HighBeam Research, Convergent Component.(DMC 100 Digital Media Center)(Brief Article)(Product Announcement). http://www.highbeam.com/DocPrint.aspx?DocId=1G1:79148704, 1, 2001.

HighBeam Research, Datacasting hits NATPE.(All systems go for iBlast, SpectraRep; queries linger for Geocast)(National Association of Television Program Executives)(Brief Article), http://www.highbeam.com/DocPrint.aspx?DocId=1G1:69977794, 1-2, 2001.

HighBeam Research, Digital Creations Partners with ZapMedia to Develop Content Management System. http://www.highbeam.com/DocPrint.aspx?DocId=1G1:61967873, 1-2, 2000.

HighBeam Research, Digital making waves at electronics show Newest devices take center stage in Las Vegas. http://www.highbeam.com/DocPrint.aspx?DocId=1P2:1433895, 1-2, 2002.

HighBeam Research, DVDINSIDER: InterVideo Introduces New DVD Player/Decoder Designed for Windows CE. http://www.highbeam.com/DocPrint.aspx?DocId=1P1:80490065, 1-2, 2000.

HighBeam Research, DVDINSIDER: MCYLicensees Array of Premium Music Events, http://www.highbeam.com/ DocFrint.aspx?DocId=1P1:80490092, 1, 2000.

HighBeam Research, DVDINSIDER: New Groundbreaking Home-Entertainment Convergence Component, http://www.highbeam.com/DocPrint.aspx?DocId=1P1:80490089. 1, 2000.

HighBeam Research, Excite(a)Home and Industry Leaders Introduce Broadband LIVE!—A Unique Consumer Broadband Showcase. http://www.highbeam.com/DocPrint.aspx?DocId=1G1:74445907, 1-2, 2001.

HighBeam Research, Harman Kardon Announces Alliance With ZapMedia to Market New Home-Entertainment Convergence Component, http://www.highbeam.com/DocFrint.aspx?DocId=1G1:68271778, 1-3, 2000.

HighBeam Research, Interactive TV & Hard Disc Drives: TV Morphs Into Media Center.(Brief Article)(Product Announcement) http://www.highbeam.com/DocFrint.aspx?DocId=1G1:71704304, 1-3, 2001.

HighBeam Research, InterVideo Unveils DVD Player/Decoder for Windows CE Devices. http://www.highbeam.com/DocFrint.aspx?DocId=1G1:66622960, 1-2, 2000.

HighBeam Research, Jackpot in Vegas. http://www.highbeam.com/DocPrint.aspx?DocId=1G1:72275279, 1-5, 2001.

HighBeam Research, Journey to the center of it all. http://www.highbeam.com/DocPrint.aspx?DocId=1P2:13124350, 1-3, 2002.

(56) References Cited

OTHER PUBLICATIONS

HighBeam Research, MAX Broadcasting Network and ZapMedia form alliance. http://www.highbeam.com/DocFrint.aspx?DocId=1G1:65376146, 1-3, 2000.
HighBeam Research, MAX Broadcasting network to provide sports content to ZapMedia and AvantGo.(Company Business and Marketing)(Brief Article), http://www.highbeam.com/DocFrint.aspx?DocId=1G1:65465098, 1, 2000.
HighBeam Research, MAX Broadcasting to provide personalized content to handheld devices through AvantGo. http://www.highbeam.com/DocPrint.aspx?DocId=1G1:65376127, 1-2, 2000.
HighBeam Research, MCY Licenses Array of Premium Music Events, http://www.highbeam.com/DocFrint.aspx?DocId'1G1:68143283, 1-2, 2000.
HighBeam Research, MediaX Corporation Receives Strategic Investment From CTI II Limited. http://www.highbeam.com/DocPrint.aspx?DocId=1G1:70347014, 1-2, 2001.
HighBeam Research, MediaX Finishes Development of MIP3 Proprietary Software Technology, Allows Complex Web Site Customization, Rating System and Content Management. http://www.highbeam.com/DocFrint.aspx?DocId=1G1:70712819, 1-3, 2001.
HighBeam Research, MediaX Sets Date for Launch of amuZnet 3.0, Provides Unprecedented User Customization & Comprehensive Market Research. http://www.highbeam.com/DocFrint.aspx?DocId=1G1:72773352, 1-3, 2001.
HighBeam Research, MediaX's amuZnet Streams Exclusive 2000 Billboard Music Awards Video Footage, Presents Multitude of Celebrity Red Carpet Interviews, http://www.highbeam.com/DocFrint.aspx?DocId=1G1:67702099, 1-2, 2000.
HighBeam Research, MediaX's www.amuZnet.com Reaches 1.3 Million Registered Users, Company Prepares to UnveilamuZnet 3.0, Breaks New Ground in Web Site Customization. http://www.highbeam.com/DocPrint.aspx?DocId=1G1:70920221, 1-2, 2001.
HighBeam Research, New brands, 2nd-gen devices enter Web audio component biz. http://www.highbeam.com/DocFrint. aspx?DocId=1P2: 13141125, 1-4, 2002.
HighBeam Research, New Software Development Manager to Oversee ANT's Engineering Team Expansion. http://www.highbeam. See ANT's Engineering Team Expansion. http://www.highbeam.com/DocPrint.aspx?DocId=1G1:76129357, 1-2, 2001.
HighBeam Research, No Shortage of Options. http://www.highbeam.com/DocPrint.aspx?DocId=1G1:71704310, 1-3, 2001.
HighBeam Research, Quantum Corporation Helps Personalize Satellite TV Ships Hard Drives for New Directv Receiver With TVo Service. http://www.highbeam.com/DocFrint.aspx?DocId=1G1:66573442, 1-3, 2000.
HighBeam Research, Quantum QuickView Audio/Video Technology Propels Delivery Platform for Zapmedia.com/Gannet Co. Inc./USA Today Venture. http://www.highbeam.com/DocFrint.aspx?DocId=1G1:61872166, 1-3, 2000.
HighBeam Research, Quiero TV Chooses ANT's Internet Software to Lead the Success of its Interactive TV Service in Spain; ANT Enables Browsing and Email in Over 200,000 Spanish Homes. http://www.highbeam.com/DocFrint.aspx?DocId=1G1:726 19407, 1-3, 2001.
HighBeam Research, Radio Free Virgin and ZapMedia Announce Strategic Partnership to Broadcast Radio FreeVirgin Music Programming Beyond the PC. http://www.highbeam.com/DocFrint.aspx?DocId=1G1:73574127, 1-2, 2001.
HighBeam Research, Spring Audio: Capitalizing on the Web.(new Internet-based products). http://www.highbeam.com/DocFrint. aspx?DocId=1G1:75706092, 1-3, 2001.
HighBeam Research, Stereophile Guide Delivers the Word on InterVideo. http://www.highbeam.com/DocFrint .aspx?DocId=1G1:70354626, 1-2, 2001.
HighBeam Research, Surveying the Soundscape.(products at the 2001 Consumer Electronics Show) http://www.highbeam.com/DocPrint.aspx?DocId=1G1:76996341, 1-6, 2001.
HighBeam Research. The Atlanta Journal and Constitution Technology Briefs. http://www.highbeam.com/DocFrint. aspx?DocId=1G1:78846924, 1-2, 2001.
HighBeam Research. This Year's Model.(content is hot topic at NATPE conference), http://www.highbeam.com/DocPrint. aspx?DocId=1G1:68914073, 1-4, 2000.
HighBeam Research, Try a New Internet-Enabled Box http://www.highbeam.com/DocPrint.aspx?Doc=1P1:49353006, 1-2, 2002.
HighBeam Research, TV online. A look at how the top station groups are developing their Internet plans, http://www.highbeam.com/DocPrint.aspx?DocId=1G1:6504403, 1-7, 2000.
HighBeam Research. Two deals for Alwaysi.com. http://www.highbeam.com/DocPrint.aspx?DocId=1G1:68650377, 1, 2000.
HighBeam Research, VC Market Shows Faith in ANT in Sum of $3.6 Million; Total Investment in ANT to Date Now S11.9 Million. http://www.highbeam.com/DocFrint.aspx?DocId=1G1:76838076, 1-2, 2001.
HighBeam Research, Want to Win the War? Show You Care. http://www.highbeam.com/DocFrint.aspx?DocId=1G1:70737116, 1-4, 2001.
HighBeam Research, Web films could press cable VOD in future. (Broadband Content). http://www.highbeam.com/DocFrint. aspx?DocId=1G1:80191602, 12, 2001.
HighBeam Research, Web Legal and Business Executive Joins Hot New Atlanta Dot.Com., http://www.highbeam.com/DocFrint. aspx?DocId=1G1:59083669, 1-3, 2000.
HighBeam Research, ZapMedia and Max Broadcasting Team-up to Provide On-demand Sports Entertainment. http://www.highbeam.com/DocPrint.aspx?DocId=1G1:65270217, 1-2, 2000.
HighBeam Research, ZapMedia and Microsoft Team to Provide Windows media Support on Breakthrough ZapStation Digital Entertainment Appliance. http://www.highbeam.com/DocFrint. aspx?DocId=1G1:65320145, 1-3, 2000.
HighBeam Research, ZapMedia Announces Content Alliance with MovieFlix.com., http://www.highbeam.com/DocPrint. aspx?DocId=1G1:64774037, 1-3, 2000.
HighBeam Research, ZapMedia Closes Additional Round of Funding. http://www.highbeam.com/DocFrint. aspx?DocId=1G1:81395544, 1-2, 2002.
HighBeam Research, ZapMedia Teams Up with Amplified and Muze to Deliver Content and Merchandizing Solutions, http://www.highbeam.com/DocPrint.aspx?DocId=1G1:63964068, 1-3, 2000.
HighBeam Research, ZapMedia(TM), Inc. and Harman Kardon(R), Inc. Announce Agreement to manufacture and Market New Entertainment Convergence Component. http://www.highbeam.com/DocPrint.aspx?DocId=1G1:68270130, 1-3, 2000.
HighBeam Research, ZapMedia, Inc. and Samsung Electro-Mechanics Form Strategic Relationship. http://www.highbeam.com/ DocPrint.aspx?DocId=1G1:70713970, 1-2, 2001.
HighBeam Research, ZapMedia.com Selects Quantum QuickView Audio/Video Storage Technology for Next-Generation Home Entertainment System, http://www.highbeam.com/DocFrint.aspx?DocId=1G1:61396356, 1-3, 2000.
ISP Business: ZapMedia and EarthLink Sign Broadband Marketing and Distribution Agreement-Internet/Web/Online Service Information—Brief Article, http://findarticles.com/p/articles/mi molGP/is 2 4/ai 80057825/print 1, 2001.
J.N. Slater, Cable Television Technology, 30-39, 130-140, and 158-169 (Ellis Horwood 1989) (1988).
James H. Morris et al., Andrew: A Distributed Personal Computing Environment, in Communication of the ACM, vol. 29 No. 3 (Mar. 1986).
Jan Gecsei. The Architecture of Videotex Systems (1983).
Jon W. Dunn & Constance A. Mayer, Variations: A Digital Music Library System at Indiana University, Proceedings of the Fourth ACM Conference on Digital Libraries, 12-19 (1999).
Laura Challman Anderson & Jeffrey B. Lotspiech, Rights Management and Security in the Electronic Library, Bulletin of the American Society for Information Science, Oct./Nov. 1995, at 21-23.
Mark Stefik, Letting Loose the Light: Igniting Commerce in Electronic Publication in Internet Dreams: Archetypes, Myths, and Metaphors (The MIT Press 1996).

(56) References Cited

OTHER PUBLICATIONS

MDIS Technical Development Team, US Army Engineering Division; Medical Diagnostic Imaging Support System Draft Performance Work Statement, Version 0.9 ific; Mar. 28, 1990.
Michael McCandless, Content distribution on the Web, IEEE Expert, vol. 11, Issue 5, 8-9 (1996).
Michael McCandless, The MP3 revolution, IEEE Intelligent Systems, vol. 14, Issue 3, 8-9 (1999).
Michael Robertson and Ron Simpson. The Official MP3.Com Guide to MP3 (Sybil Sosin, ed. 1999).
Nathan J. Muller, Improving and Managing Multimedia Performance Over TCP/IP Nets, International Journal of Network Management, vol. 8, 356-367 (1998).
P.W. Bagenal & S.M. Upton, Customer Management and the Eurocypher Conditional Access System. At British Satellite Broadcasting, International Broadcasting Convention, Sep. 21-25, 1990 at 270-277.
Patrick R. Parsons & Robert M. Frieden, The Cable and Satellite Television Industries, 1-18, 68-114, and 157-203 (1998).
Plaintiffs Reply to Defendant's Counterclaims, Case No. 2:08-CV-I04-DF-CE, May 20, 2008.
Ruth E. Dayhoff & Eliot L. Siegel, Digital Imaging Within and Among Medical Facilities, in Computerizing Large Integra Ted Health Networks 473 (Robert M. Kolodner ed. 1997).
S. Merrill Weiss, Issues in Advanced Television Technology, vii-XV, 1996.
Slashdot, ZapStation Cd/MP3/DVD Player/Server, http://hardware.slashdot.org/article.pl?nod2=1&sid=00/09/22/2223221. 1-4, 2000.
Stefano Antoniazzi & Gottfried Schapeler, An Open Software Architecture for Multimedia Consumer Terminals, in Multimedia Applications, Services and Techniques—ECMAST '97621 (Serge Folida & Michele Morganti eds., May 1997).
The Roots of Storage and Transmission, 44-51. First Published Nov. 1994. No. 24 in the Series.
Tim Berners-Lee, Information Management: A Proposal, CERN, 1-21 (1989).
WAP Push Message, "Wireless Application Protocol Push Message Specification," Aug. 16, 1999, WAP Foru, 13 pages.
ZAP Media Tools US, ZapSolution. http://www.zapsolution.com/Zmtus.htm 1-3.
ZapMedia Serivees, Inc. v. Apple Inc., Plaintiffs Claim Construction Reply Brief, Civil Action No. 2:08-CV-104-DF-CE, dated Feb. 16, 2009.
ZapMedia Services, Inc.'s Responses to Apple, Inc.'s First Set of Interrogatories, Case No. 2:08-CV-I04-DF-CE. Dec. 5, 2008.
ZapMedia's Opening Claim Construction Brief, Case No. 2:08-cv-104-DF-CE, Dec. 23, 2009.
Hancock, et al., Software Control of Multimedia Device Interconnection, ip.com, p. 569-572, Mar. 20, 2005.
Fielding, "RFC 2616" Jun. 1999, IETF, 152 pages.
HighBeam Research, Excite(a)Home Lives the Broadband Lifestyle. (Brief Article). http://www.highbeam.com/DocFrint.aspx?DocId=1G1:75101455, 1-2, 2001.
Sharon Carmen Chavez Mobley, Moving to ClinicalWorkstations, in Computerizing Large Integrated Health Networks 473 (Robert M. Kolodner ed. 1997).
Orion Hodson, Socrates Varakliotis, & Vicky Hardman, A Software Platform for Multiway Audio Distribution Over the Internet, IEE Colloquium on Audio and Music Technology: The Challenge of Creative DSP (1998).
Apple Inc. Mac 101: The Dock', published onlineathttp://support.apple.com/kb/ht2474 on Dec. 18, 2009, last retrieved on Sep. 17, 2011, 4 pages.
Push the button, choose a movie, it's that simple . . . (COXCOMM000137-143).
Cox Digital Cable, It's not more TV. It's better TV. (COXCOMM000144-147).
Cox Digital Cable, It's not more TV. It's better TV (2). (COXCOMM000148-151).
New Year new experience, last chance to experience it for $49. (COXCOMM000152-153).
Making life easier. (COXCOMM000154-157).
Discover a new view with Cox. (COXCOMM000158-167).
Lader A Ranch, Oak Knoll Village Club. (COXCOMM000168-175).
Magic from Morning till Night. (COXCOMM000176-179).
It began with a man, a mouse, and a little Magic. (COXCOMM000180-187).
Cast Off for a bundle of fun. (COXCOMM000188-195).
Think you've done Digital? Not until you've tried Cod in Demand pay-per-view . . . . (COXCOMM000196-203).
Cox Digital Cable takes you beyond ordinary TV. (COXCOMM000204-211).
Magic from Morning till Night (2). (COXCOMM000212-215).
A new spectrum of choices. (COXCOMM000216-223).
Cox Colleen Langer. (COXCOMM000232).
Simplify your life. (COXCOMM000238-245).
Mega Movies in demand. (COXCOMM000246-248).
Cox digital TV delivers a universe of programming choices. (COXCOMM000249-252).
Freeze, Jill T.: Sams Teach Yourself Microsoft Internet Explorer 5 in 24 Hours, 1999, Sams Publishing, pp. 21, 101-103,214-220.
CNN.com, Jan. 29, 2003.
HighBeam Research, ZapMedia Announces Alliance With MediaX for Multimedia Content. http://www.highbeam.com/docFrint. aspx?DocId=1G1:66089994, 1-3, 2000.
International Preliminary Examination Report re PCT Application No. PCT/US01/02315, completed Sep. 4, 2002.
International Search Report and Written Opinion of PCT/US2012/021908, completed on Aug. 30, 2012.
International Preliminary Report on Patentability of PCT/US2012/021908, dated Jul. 23, 2013.
International Search Report of PCT/US2012/069193, dated Mar. 18, 2013.
International Preliminary Report on Patentability of PCT/US2012/069193, dated Jun. 17, 2014.
International Search Report and Written Opinion of PCT/US2013/035391, dated Aug. 7, 2013.
http://ajaxpatterns.org/Predictive_Fetch. Retrieved Feb. 20, 2009.
http://en.wikipedia.org/wiki/Ichat Retrieved Feb. 20, 2009.
http://en.wikipedia.org/wiki/Second_Life. Retrieved Feb. 20, 2009.
http://extratorrent.com/torrentl9051981Text+Message+to+TV+Screen+by+FireText.html. Retrieved Feb. 20, 2009.
http://farm2.static.flickr.com/1321/1352786329_808877273e_o.png Retrieved Feb. 20, 2009.
http://help.yahoo.com/tutorials/cg/mail/cg_chatadv2.html. Retrieved Feb. 20, 2009.
http://in.content.mobie.yahoo.com/new/groups/tour3.html Retrieved Feb. 20, 2009.
http://iphone.cazisoft.coml?paged=11 Retrived Feb. 20, 2009.
http://mashable.com/2007/09/20/virgin-mobile-3iaml. Retrieved Feb. 20, 2009.
http://modmyi.com/forums/new-skins-themes-launches/4610-sms-balloon-collection.html Retrieved Feb. 20, 2009.
http://mooseyard.com/Jens/2005/06/little-boxes-of-wordsl. Retrieved Feb. 20, 2009.
http://mooseyard.comlJens/wp-contentlluploads/2008/03/balloon-chat-ui-21-april-1997.png. Retrieved Feb. 20, 2009.
http://news.cnet.com/8301-13579_3-9962739-37.html. Retrieved Feb. 20, 2009.
http://news.cnet.com/8301-13580_3-9768707-39.html. Retrieved Feb. 20, 2009.
http://slfix.com/?p+658. Retrieved Feb. 20, 2019.
http://twitter.com/ Retrieved Feb. 20, 2009.
http://www.apple.com/macosxlfeatures/300.html#ichat Retrieved Feb. 20, 2009.
http://www.apple.com/macosxlfeatures/ichat.html Retrieved Feb. 20, 2009.
http://www.appsafari.com/chat/1452/group2call Retrieved Feb. 20, 2009.
http://www.appsafarLoom/utilites/837/beejive-im/ Retrieved Feb. 20, 2009.

(56) References Cited

OTHER PUBLICATIONS http://www.boygeniusreport.com/gallery/handsets/beejive-for-iphonel Retrieved Feb. 20, 2009.
http://www.cssplay.co.uklmenu/bubbles Retrieved Feb. 20, 2009.
http://www.dbug.org/publications/articles/ichat_1_review.shtml Retrieved Feb. 20, 2009.
http://www.extext.coml. Retrieved on Feb. 20, 2009. Cumulative citation, no copy attached per 37 C.F.R. 1.98(c).
http://www.eztexting.com/ Retrieved Feb. 20, 2009.
http://www.faculty.idc.ac.il/arikllMRet-All.mov. Retrieved on Feb. 20, 2009. Cumulative citation, no copy attached per 37 C.F.R. 1.98(c).
http://www.flickr.com/photos/rmohns/1752400601/ Retrieved Feb. 20, 2009.
http://www.group2call.com/ Retrieved Feb. 20, 2009.
http://www.ilounge.com/index.php/articles/comments/iphone-gems-the-best-instant-messaging-apps Retrieved Feb. 20, 2009.
http://www.iminent.com/default.aspx. Retrieved on Feb. 20, 2009, Cumulative citation, no copy attached per 37 C.F.R. 1.98(c).
http://www.intomobile.com/2007/12/07/change-your-iphones-sms-text-message-bubbles-to-a-malte-finish-iphone-.
http://www.iphonehacks.com/2007/07/iphone-trillan.html Retrieved Feb. 20, 2009.
http://www.iphonehacks.com/2007/08/iphone-mundu-im.html. Retrieved Feb. 20, 2009.
http://www.jabber.org/au/ichat Retrieved Feb. 20, 2009.
http://www.labnol.org/internet/google-sms-subscribe-rss-via-sms/47261/ Retrieved Feb. 20, 2009.
http://www.mac.com/1/images/ichat_screeshot1_20051012.jpg Retrieved Feb. 20, 2009.
http://www.macupdate.com/info.php/id/24959 Retrieved Feb. 20, 2009.
http://www.mysupergroups.com/faqs Retrieved Feb. 20, 2009.
http://www.mysupergroups.com/tour Retrieved Feb. 20, 2009.
http://www.openwave.com/us/news_room/press_releases/2002/20020319OpWVmmsandsms0319.htm. Retrieved Feb. 20, 2009.
http://www.sendgroupsms.com/ Retrieved Feb. 20, 2009.
http://www.slashphone.com/xumii-launches-first-social-address-book-for-mobile-phones-at-demofail-08-212021, Retrieved Feb. 20, 2009.
http://www.smsgupshup.com/help. Retrieved on Feb. 20, 2009.
http://www.sweetim.com/ Retrieved Feb. 20, 2009.
http://www.talkshoe.com/se/abouUTSAbout.html. Retrieved Feb. 20, 2009.
http://www.tatango.com/tatango/details. Retrieved on Feb. 20, 2009.
Http://www.techcrunch.com/2006/09/27/a-look-at-eight-multi-person-sms-servicesl. Retrieved Feb. 20, 2009.
http://www.techcrunch.com/2007/08/15/most-useful-iphone-site-yet-meebol Retrieved Feb. 20, 2009.
http://www.testiphone.com/. Retrieved on Feb. 20, 2009. Cumulative citation. no copy attached per 37 C.F.R. 1.98 (c).
http://www.textually.org/textually/archives/2007/12/018249.htm Retrieved Feb. 20, 2009.
http://www.there.com/whatisThere.html. Retrieved Feb. 20, 2009.
Http://www.txtblaster.com/ Retrieved Feb. 20, 2009.
http://www.whyville.net/smmkinice. Retrieved Feb. 20, 2009.
http://www.xumiL.com/ Retrieved Feb. 20, 2009.
http://www.youtube.com/watch?v=rllgNvybcR4. Retrieved on Feb. 20, 2009. Cumulative citation, no copy attached.
http://www.youtube.com/watch?v=VDnzgvRh6Xk. Retrieved on Feb. 20, 2009. Cumulative citation, no copy.
Office Action dated Feb. 2, 2012 for U.S. Appl. No. 12/342,838, 20 pages.
Office Action dated Mar. 21, 2013 for U.S. Appl. No. 12/342,838, 37 pages.
Office Action dated Jun. 6, 2012 for U.S. Appl. No. 12/342,838, 28 pages.
Office Action dated Aug. 14, 2013 for U.S. Appl. No. 12/342,838, 39 pages.
Office Action dated Nov. 1, 2012 for U.S. Appl. No. 12/342,838, 26 pages.
Office Action dated Sep. 15, 2014 for U.S. Appl. No. 14/193,753, 39 pages.
Office Action dated Sep. 29, 2011 for U.S. Appl. No. 12/342,838, 35 pages.
Office Action dated Sep. 29, 2015 for U.S. Appl. No. 14/698,801, 41 pages.
www.3jam.com. Retrieved Feb. 20, 2009.
U.S. Pat. No. 7,020,704, Restriction Requirement dated Aug. 13, 2002, Response to Election/Restriction dated Sep. 16, 2002, Non-Final Rejection dated Nov. 26, 2002, Response After Non-Final Rejection dated Feb. 19, 2003, Final Rejection dated May 5, 2003, Response to Final Rejection dated Sep. 22, 2003, Advisory Action dated Oct. 16, 2003, Request for Continued Examination dated Nov. 5, 2003, Response to Non-Compliant Amendment dated Dec. 10, 2003, Non-Final Rejection dated Mar. 3, 2004, Resonse After Final Rejection dated Aug. 3, 2004, Supplemental Amendment dated Oct. 4, 2004, Final Rejection dated Dec. 8, 2004, Response After Final Rejection dated May 10, 2005, Notice of Allowance dated May 27, 2005.
U.S. Pat. No. 7,343414, Preliminary Amendment dated Mar. 29, 2006, Non-Final Rejection dated Mar. 15, 2007, Response After Non-Final Rejection dated Sep. 17, 2007, Supplemental Amendment dated Nov. 29, 2007, Notice of Allowance dated Jan. 8, 2008.
U.S. Pat. No. 9,143,809, Preliminary Amendment dated May 25, 2006, Preliminary Amendment dated May 2, 2008, Preliminary Amendment dated Jun. 2, 2008, Non-Final Rejection dated Dec. 1, 2009, Response to Non-Final Office Action dated Apr. 13, 2011, Notice of Allowance dated May 12, 2011, Request for Continued Examination dated May 27, 2011, Preliminary Amendment dated May 27, 2011, Supplemental Amendment dated Sep. 10, 2012, Requirement for Restriction/Election dated Oct. 10, 2013, Response to Election/Restriction dated Oct. 28, 2013, Non-final rejection dated Dec. 24, 2013, Response to Non-Final Rejection dated Apr. 24, 2014, Non-Final Rejection dated Jul. 30, 2014, Response After Final Rejection dated Oct. 29, 2014, Final Rejection dated Jan. 7, 2015, Response to Final Rejection dated Apr. 7, 2015, Notice of Allowance dated Aug. 6, 2015.
U.S. Pat. No. 7,346,687, Preliminary Amendment dated May 25, 2006, Non-Final Rejection dated May 22, 2007, Response After Non-Final Rejection dated Oct. 22, 2007, Notice of Allowance dated Jan. 17, 2008.
U.S. Appl. No. 14/829,606, Requirement for Restriction/Election dated Apr. 14, 2017, Response to Election/Restriction dated Jun. 16, 2017, Non-Final Rejection dated Aug. 18, 2017, Response After Non-Final Rejection dated Nov. 20, 2017, Final Rejection dated Dec. 14, 2017.
U.S. Appl. No. 09/768,933, Non-Final Rejection dated Apr. 21, 2003, Response After Non-Final Rejection dated Aug. 20, 2003, Final Rejection dated Nov. 3, 2003, Amendment After Final Rejection dated Apr. 12, 2004, Advisory Action dated May 10, 2004.
U.S. Pat. No. 7,849,135, Non-Final Rejection dated Oct. 9, 2007, Response After Non-Final Rejection dated Jan. 9, 2008, Non-Final Rejection dated Apr. 14, 2008, Response After Non-Final Rejection dated Jul. 14, 2008, Final Rejection dated Oct. 10, 2008 , Response to Final Rejection & RCE dated Jan. 12, 2009, Non-Final Rejection dated Mar. 12, 2009, Amendment After Non-Final Rejection dated Jun. 10, 2009, Final Rejection dated Sep. 24, 2009, Response to Final Rejection & RCE dated Dec. 22, 2009, Non-Final Rejection dated Feb. 17, 2010, Response to Non-Final Rejection dated May 17, 2010, Notice of Allowance dated Aug. 3, 2010.
U.S. Pat. No. 8,700,072, Non-Final Rejection dated Sep. 29, 2011, Response After Non-Final Rejection dated Dec. 14, 2011, Final Rejection dated Feb. 2, 2012, Amendment After Final Rejection & RCE dated May 2, 2012, Non-Final Rejection dated Nov. 1, 2012, Response After Non-Final Rejection dated Jan. 22, 2013, Final Rejection dated Mar. 21, 2013, Response After Final Rejection & RCE dated Jun. 17, 2013, Non-Final Rejection dated Aug. 14, 2013, Response after Non-Final Rejection dated Nov. 14, 2013, Notice of Allowance dated Dec. 2, 2013.

(56) References Cited

OTHER PUBLICATIONS

U.S. Pat. No. 9,049,163, Preliminary Amendment dated Mar. 17, 2014, Non-Final Rejection dated Sep. 15, 2014, Response After Non-Final Rejection dated Dec. 15, 2014, Notice of Allowance dated Jan. 29, 2015.
U.S. Pat. No. 9,356,900, Non-Final Rejection dated Sep. 29, 2015, Response After Non-Final Rejection dated Dec. 29, 2015, Notice of Allowance dated Feb. 4, 2016.
U.S. Pat. No. 10,257,148, Non-Final Rejection dated Mar. 9, 2018, Response After Non-Final Rejection dated Sep. 7, 2018, Notice of Allowance dated Nov. 21, 2018.
U.S. Appl. No 16/356,202, Non-Final Rejection dated Dec. 13, 2019.
U.S. Pat. No. 8,428,626, Non-Final Rejection dated Oct. 21, 2011, Response After Non-Final Rejection dated Jan. 23, 2012, Final Rejection dated Mar. 12, 2012, Amendment After Final Rejection dated Jun. 12, 2012, Non-Final Rejection dated Jun. 26, 2012, Response After Non-Final Rejection dated Sep. 26, 2012, Notice of Allowance dated Dec. 21, 2012.
U.S. Pat. No. 8,615,262, Preliminary Amendment dated Mar. 21, 2013, Notice of Allowance dated Aug. 15, 2013.
U.S. Pat. No. 8,566,403, Non-Final Rejection dated Apr. 27, 2011, Response After Non-Final Rejection dated Jul. 27, 2011, Final Rejection dated Oct. 27, 2011, Amendment After Final Rejection dated Jan. 24, 2012, Non-Final Rejection dated Jun. 26, 2012, Response After Non-Final Rejection dated Sep. 26, 2012, Final Rejection dated Jan. 2, 2013, Amendment After Final Rejection & RCE dated Mar. 27, 2013, Notice of Allowance dated Jun. 21, 2013.
U.S. Pat. No. 9,589,013, Non-Final Rejection dated Feb. 17, 2016, Response After Non-Final Rejection dated May 17, 2016, Final Rejection dated Aug. 12, 2016, Amendment After Final Rejection dated Oct. 20, 2016, Notice of Allowance dated Oct. 20, 2016.
U.S. Appl. No. 15/429,149, Non-Final Rejection dated Sep. 10, 2018, Response After Non-Final Rejection dated Mar. 7, 2019, Final Rejection dated Apr. 24, 2019.
U.S. Appl. No. 12/343,359, Non-Final Rejection dated Jun. 28, 2011, Response After Non-Final Rejection dated Sep. 19, 2011, Final Rejection dated Jan. 9, 2012, Amendment After Final Rejection & RCE dated Apr. 9, 2012, Non-Final Rejection dated Jun. 13, 2012, Response After Non-Final Rejection dated Sep. 13, 2012, Amendment After Final Rejection & RCE dated Apr. 1, 2013, Non-Final Rejection dated May 7, 2013, Response After Non-Final Rejection dated Aug. 5, 2013, Final Rejection dated Nov. 22, 2013.
U.S. Pat. No. 8,799,820, Non-Final Rejection dated Jul. 8, 2011, Response After Non-Final Rejection dated Oct. 6, 2011, Final Rejection dated Dec. 22, 2011, Amendment After Final Rejection & RCE dated Mar. 22, 2012, Non-Final Rejection dated Sep. 5, 2012, Response After Non-Final Rejection dated Dec. 3, 2012, Final Rejection dated Jan. 2, 2013, Amendment After Final Rejection & RCE dated Apr. 2, 2013, Non-Final Rejection dated Jul. 16, 2013, Response After Non-Final Rejection dated Oct. 16, 2013, Final Rejection dated Dec. 4, 2013, Amendment After Final Rejection & RCE dated Mar. 4, 2014, Notice of Allowance dated Mar. 27, 2014.
U.S. Pat. No. 9,766,784, Non-Final Rejection dated May 9, 2016, Response After Non-Final Rejection dated Aug. 9, 2016, Final Rejection dated Oct. 6, 2016, Amendment After Final Rejection dated Jan. 6, 2017, Request for Continued Examination dated Jan. 6, 2017, Notice of Allowance dated May 15, 2017.
U.S. Appl. No. 12/343,402, Non-Final Rejection dated Jun. 14, 2011, Response After Non-Final Rejection dated Sep. 13, 2011, Final Rejection dated Dec. 29, 2011, Amendment After Final Rejection & RCE dated Mar. 29, 2012, Non-Final Rejection dated Jun. 13, 2012, Response After Non-Final Rejection dated Sep. 13, 2012, Final Rejection dated Dec. 31, 2012, Amendment After Final Rejection & RCE dated Mar. 27, 2013, Non-Final Rejection dated May 22, 2013, Response After Non-Final Rejection dated Aug. 22, 2013, Final Rejection dated Nov. 21, 2013, Amendment After Final Rejection & RCE dated Feb. 21, 2014, Non-Final Rejection dated Apr. 22, 2014, Response After Non-Final Rejection dated Jul. 22, 2014, Final Rejection dated Oct. 22, 2014.
U.S. Pat. No. 8,893,040, Non-Final Rejection dated Jun. 7, 2011, Response After Non-Final Rejection dated Sep. 6, 2011, Final Rejection, Sep. 28, 2011, Amendment After Final Rejection & RCE dated Dec. 27, 2011, Non-Final Rejection dated Apr. 9, 2013, Response After Non-Final Rejection dated Jun. 25, 2013, Final Rejection dated Sep. 13, 2013, Amendment After Final Rejection & RCE dated Dec. 13, 2013, Notice of Allowance dated Feb. 7, 2014, 312 Amendment dated Feb. 21, 2014.
U.S. Pat. No. 9,342,225, Notice of Allowance dated Jan. 20, 2016.
U.S. Pat. No. 10,22,945, Non-Final Rejection dated Mar. 9, 2018, Response After Non-Final Rejection dated Sep. 7, 2018, Notice of Allowance dated Oct. 23, 2018.
U.S. Pat. No. 9,289,018, Preliminary Amendment, dated May 2, 2012, Non-Final Rejection dated Apr. 17, 2015, Response After Non-Final Rejection dated Oct. 7, 2015, Final Rejection dated Oct. 22, 2015, Amendment After Final Rejection dated Nov. 20, 2015, Notice of Allowance dated Nov. 30, 2015.
U.S. Appl. No. 15/019,929, Non-Final Rejection dated Jul. 13, 2017.
U.S. Pat. No. 9,424,334, Non-Final Rejection dated Feb. 9, 2015, Response After Non-Final Rejection dated Jun. 8, 2015, Final Rejection dated Jul. 15, 2015, Amendment After Final Rejection & RCE dated Oct. 1, 2015, Preliminary Amendment dated Oct. 7, 2015, Non-Final Rejection dated Jan. 20, 2016, Response After Non-Final Rejection dated Mar. 23, 2016, Notice of Allowance dated Jul. 12, 2016.
U.S. Appl. No. 13/857,248, Non-Final Rejection dated Oct. 24, 2014.
U.S. Pat. No. 9,639,861, Non-Final Rejection dated Dec. 3, 2015, Response After Non-Final Rejection dated Mar. 3, 2016, Final Rejection dated Apr. 8, 2016, Amendment After Final Rejection dated May 25, 2016, Advisory Action dated Jun. 15, 2016, Amendment After Final Rejection & RCE dated Aug. 31, 2016, Notice of Allowance dated Dec. 23, 2016, 312 Amendment dated Dec. 23, 2016.
U.S. Appl. No. 15/465,546, Non-Final Rejection dated Apr. 21, 2017, Response After Non-Final Rejection dated Dec. 6, 2017, Final Rejection dated Aug. 3, 2018, Amendment After Final Rejection dated Sep. 26, 2018, Notice of Allowance dated Oct. 18, 2018, 312 Amendment dated Jan. 8, 2019, Request for Continued Examination dated Jan. 15, 2019, Notice of Allowance dated Mar. 1, 2019.
U.S. Appl. No. 15/703,922, Non-Final Rejection dated May 24, 2019.
U.S. Pat. No. 9,191,786, Non-Final Rejection dated Feb. 18, 2014, Response After Non-Final Rejection dated May 19, 2014, Final Rejection dated Jul. 21, 2014, Amendment After Final Rejection & RCe dated Oct. 21, 2014, Non-Final Rejection dated Nov. 10, 2014, Response After Non-Final Rejection dated Feb. 10, 2015, Non-Final Rejection dated Mar. 26, 2015, Response After Non-Final Rejection dated Jun. 26, 2015, Notice of Allowance dated Jul. 13, 2015.
U.S. Pat. No. 9,414,208, Non-Final Rejection dated Dec. 22, 2015, Response After Non-Final Rejection dated Mar. 22, 2016, Notice of Allowance dated Apr. 11, 2016.
U.S. Pat. No. 9,674,120, Non-Final Rejection dated Oct. 4, 2016, Response After Non-Final Rejection dated Jan. 4, 2017, Notice of Allowance dated Jan. 31, 2017.
U.S. Appl. No. 15/600,789, Non-Final Rejection dated Oct. 20, 2017.
U.S. Appl. No. 16/660,573, Preliminary Amendment dated Apr. 7, 2020.
U.S. Appl. No. 16/292,051, Non-Final Rejection dated Apr. 8, 2020, Response After Non-Final Rejection dated Aug. 6, 2020.
U.S. Appl. No. 16/426,978, filed May 30, 2019.
U.S. Appl. No. 16/660,523, Preliminary Amendment dated Apr. 7, 2020, Non-Final Rejection dated Jun. 26, 2020.

SCALABLE MESSAGE FIDELITY

CROSS-REFERENCE TO RELATED APPLICATION

This application is a continuation of, and claims priority to each of, U.S. patent application Ser. No. 16/356,202, filed on 18 Mar. 2019, and entitled "SCALABLE MESSAGE FIDELITY," which is a continuation of U.S. patent application Ser. No. 15/147,837, filed on 5 May 2016, and entitled "SCALABLE MESSAGE FIDELITY," now issued as U.S. Pat. No. 10,257,148, which is a continuation of U.S. patent application Ser. No. 14/698,801, filed on 28 Apr. 2015, and entitled "SCALABLE MESSAGE FIDELITY," now issued as U.S. Pat. No. 9,356,900, which is a continuation of U.S. patent application Ser. No. 14/193,753, filed on 28 Feb. 2014, and entitled "SCALABLE MESSAGE FIDELITY," now issued as U.S. Pat. No. 9,049,163, which is a continuation of U.S. patent application Ser. No. 12/342,838, filed on Dec. 23, 2008 and entitled "SCALABLE MESSAGE FIDELITY," now issued as U.S. Pat. No. 8,700,072. The entireties of the above noted applications and patent are hereby incorporated by reference herein.

BACKGROUND

Technology seeks to aid human communication. Communication is a process that includes a sender and a receiver who converse over some medium. There are two main types of communication of which technology conventionally assists namely verbal and written communication. For example, traditional telephones are devices utilized to transmit and receive sound or more specifically voice communication amongst participants. This swung communication away from handwritten letters to telephonic voice communication. The advent of computers and the Internet brought written communication back in vogue by way of e-mail (electronic mail) and instant messaging (IM). Further, development of mobile communication devices offers support for voice and written capability utilizing SMS (Short Messaging Service) and/or MMS (Multimedia Messaging Service), for instance.

E-mail is a store-and-forward style technology for written electronic communication. E-mail systems provide facilities for sending, receiving, and transmitting messages electronically, among other things. Messages can be entered utilizing a text editor and addressed to recipients utilizing a related e-mail address. Such messages can then be saved in a sender's mailbox, sent across a network such as the Internet to a message server, and subsequently pushed or forwarded to a recipient's mailbox. While e-mail is fast and reliable, it is also a very flexible communication means. For example, in addition to written text, it can also include pictures, audio, and/or links to websites, among other things.

IM (Instant Messaging) is a form of real-time communication or chatting amongst individuals using typed text, among other things. Computers or other devices connected to a network such as the Internet can facilitate communication in this manner. In general, IM differs from e-mail in that text messages appear before users in substantially real-time or instantly. Messages sent to individuals who are not on-line and/or connected to the service cannot be completed. However, some systems have been developed that allow messages to be sent to off-line individuals thereby blurring the distinction between IM and email.

SMS (Short Messaging Service) is a communication protocol that enables short text messaging between mobile communications devices. SMS is a hybrid e-mail—IM technology for mobile devices such as phones. Like e-mail, SMS is a store-and-forward technology. Messages are sent and received utilizing a message service center that acts as an intermediary between senders and recipients. Further, messages are limited to text messages and in particular short messages. In addition, the speed at which text messages are delivered, if at all, can be affected by inherent connectively issues such as where a user has a poor communication signal or is out of range.

MMS (Multimedia Messaging Service) is an extension to SMS to enable multimedia objects such as images and audio to be sent amongst mobile communication devices. MMS messages are sent in a similar fashion as SMS messages except that multimedia content is first encoded and inserted in a manner analogous to e-mail. Like SMS, however, MMS is not the same as e-mail since it is based multimedia messaging concepts where messages are afforded in accordance with a presentation file, among other things.

The above noted messaging technologies are distinct for the most part. For example, e-mail and IM are confined to computers while SMS and MMS are associated with mobile devices. Nevertheless, some devices, such as so-called smart phones, are essentially small handheld computers with phone capabilities. Accordingly, smart phones can enable use of both technologies but through different supporting infrastructure. For instance, a user can text message using SMS or via IM by logging in through a web browser.

DETAILED DESCRIPTION OF THE PREFERRED EMBODIMENT

Systems, methods, apparatuses, and the like pertaining to scalable message fidelity are described in detail hereinafter.

Messaging systems and/or associated communication devices can support varying levels of content richness or fidelity. Rather than baring communication between different systems, scaling of messages or message content can be employed to ensure communication in as rich a manner as supported, among other things. Accordingly, messages or portions thereof can be scaled down or degraded, or scaled up or enriched. In other words, message fidelity is scalable.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

In one or more embodiments, the subject disclosure pertains to scaling message richness or fidelity. Differences can exist between the richness of a message and support by a receiving device and/or messaging system. Further, the difference can be in either direction. For instance, a message can be richer than a device supports or support can be provided for richer content than a message provides. Fidelity scaling can be employed to bridge this gap and facilitate communication. Further, communication can be aided by notifying a sender and/or receiver that a composed message is not the same as that rendered to a recipient to avoid confusion, among other things.

In accordance with one aspect of the disclosure, scaling can be employed to map high fidelity messages produced by a rich message system to legacy devices. By way of example and not limitation, audio can be converted to text; video can be transformed to a series of still images with optional text; or a webpage, map, or image can be replaced by a link thereto alone or in combination with descriptive text.

Figure 1:
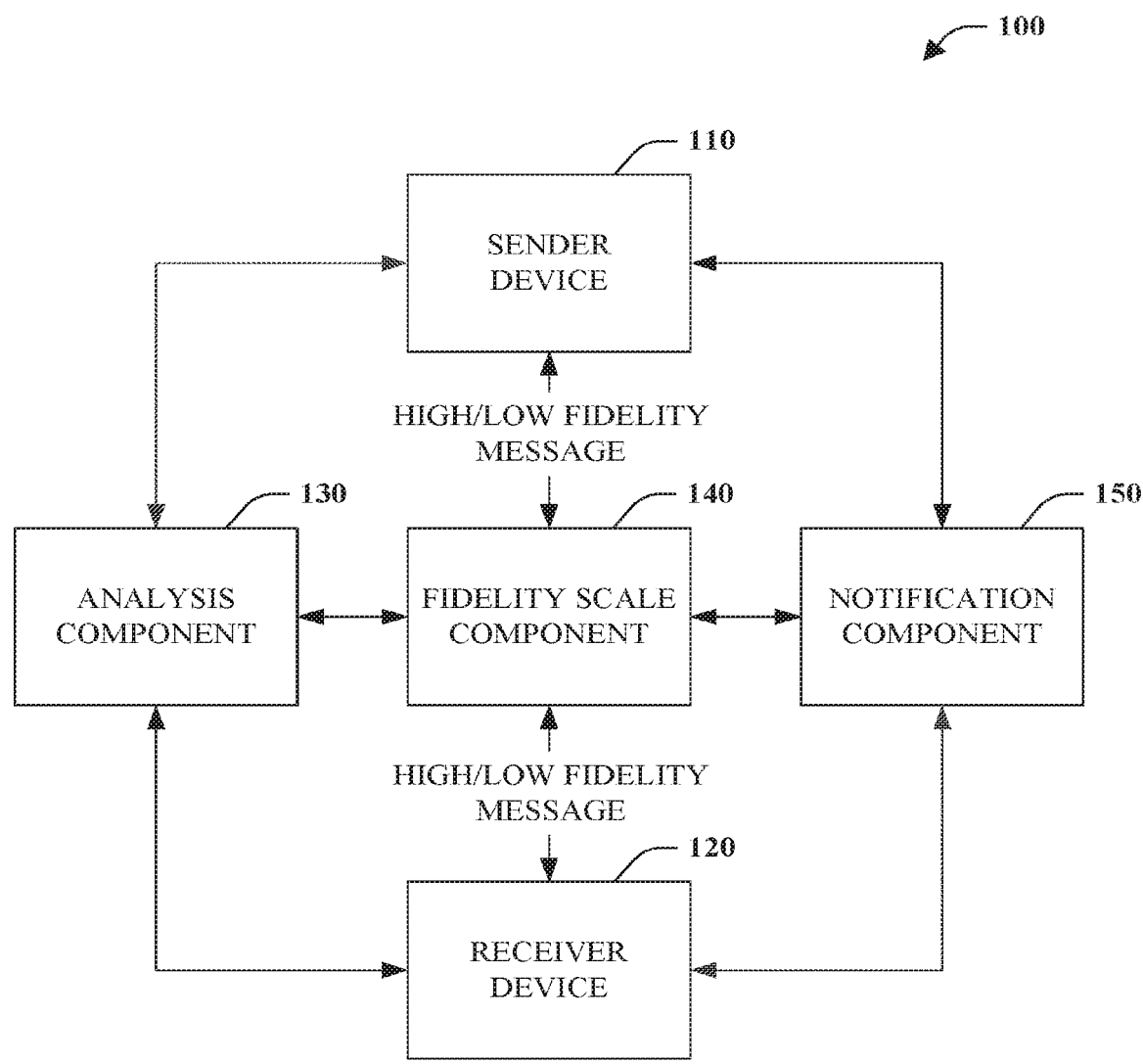
FIG. 1 is a block diagram of a scalable message system in accordance with an aspect of the disclosed subject matter.

Referring initially to FIG. 1, a scalable message system 100 is illustrated in accordance with an aspect of the claimed subject matter. The system 100 includes a sender device 110 and a receiver device 120. Of course, a single device can be both a sender at a receiver at different times, but are delineated here for purposes of explanation. Sender device 110 and/or associated messaging system or subsystem, can transmit a message electronically to a target or receiver device 120 and/or associated messaging system or subsystem (not shown). Although not limited thereto, in accordance with one aspect, the message can correspond to a thread style message that is communicated substantially in real-time or instantaneously. The richness or fidelity of the transmitted message can vary, for example as a function of support provided by the sender device 110. Similarly, the receiver device 120 can support different levels of message richness. Accordingly, a sort of messaging impedance mismatch can occur. By way of example and not limitation, consider a simple situation in which a sender device includes integrated support for MMS and a receiver device supports SMS and not the multimedia extension. As a result, the receiver device 120 does not have native support for pictures, audio, and/or video that can be transmitted by the sender device 110. Analysis component 130 and fidelity scale component 140 operate to facilitate rich communication amongst the sender device 110 and receiver device 120 in this context.

The analysis component 130 performs analysis to determine, infer, or otherwise identify messaging capabilities of the receiver device 140. For instance, the device itself can be interrogated, information can be gathered about capabilities from a third party (e.g., manufacturer, service provider, social networks . . . ), or previous interactions can be analyzed. Furthermore, inferences can be made with respect to a manufacturer of a device and/or type or style of device, amongst other contextual factors. It should be further appreciated that the analysis component 130 can be communicatively coupled to the sender device 110 to aid discovery of capabilities thereof. However, since all or anyone of those capabilities may or may not be employed with respect to a message, processing can be left to the fidelity scale component 140. Additionally or alternatively, the analysis component 130 can analyze messages as they are composed and subsequently sent.

The fidelity scale component 140 or simply scale component 140 transforms or scales messages to a receiver device supported level of message richness. Based on information from the analysis component 130 regarding messaging support as well as a message itself, scaling can occur.

Scaling can be multidirectional. In particular, a message or message content can be scaled down or scaled up. In other words, message content can be degraded or enriched. For example, if the sender device 110 produces a rich or high fidelity message and the receiver device 120 does not support that level of richness, the message can be scaled down or degraded. Alternatively, if a low fidelity message is afforded by the sender device 110 and the receiver device 120 supports greater message fidelity, then the message can be scaled up or enriched. Of course, where the sender and receiver devices 110 and 120, respectively, support the same level of message richness, the message can simply pass through the scale component 140 without augmentation.

In accordance with one embodiment, the sender device 110 and associated messaging system can support a high level of message richness or fidelity, while the receiver devices 120 are legacy devices that support lower levels or richness. In this manner, the messages can be scaled to facilitate interaction with legacy devices. For instance, the message can include a combination of SMS, MMS, IM, and/or email type features that are transmitted across SMS and/or IP backbones to mobile devices. In particular, messages can be grouped into conversations between participants including conversation bubbles capturing a message. Moreover, the messages can include text, images, audio, video, emoticons, maps, and/or websites, among other things. In other words, messaging need not be confined to simple text or multimedia supported by MMS. For example, an actual web page can form part of a message sent not just a link thereto. A receiver or legacy device 120 can support at most a subset of such messaging content. Scaling can be employed to facilitate conversation between devices that support different messaging content or message richness/fidelity.

According to one aspect of the claimed subject matter, message scaling can be performed intelligently. For instance, messages can be scaled up to a maximum level or richness or fidelity supported by a receiver device 120. In other words, scaling can seek to ensure messages are as rich as possible given particular support. Rather than refusing to accept or transmit a message with unsupported content or simply stripping such content from the message, a scaled message can seek to leverage available support to facilitate conversation. By way of example, not limitation, consider a scenario in which a message is sent with an embedded web page therein. Based on support provided by the receiver device 120, the message or content can be scaled in different ways. Where a device simple supports text, the message can be scaled to include the web page URL (Uniform Resource Locator) as well as some text describing the webpage such as the title as well as various content and or metadata to facilitate participation in a conversation. Alternatively, if the device also supports embedded picture messages, an image of the web page can be sent alone or in conjunction with the URL and descriptive text information.

Notification component 150 is communicatively coupled to the fidelity scale component 140 as well as the sender device 110 and the receiver device 120. As the name suggests, the notification component 150 can notify or otherwise inform a message sender and/or receiver when a message has be scaled or transformed by the scale component 140. For instance, a user of substantially antiquated device with respect to messaging technology can be notified when the message received was scaled. A sender of the message can also be similarly informed. Such notification can simply note the fact that the message was scaled and/or identify specific alterations made during the scaling process. In one implementation, notification can be embodied in or as part of a message. For example, a received message can include text and/or a signal indicative scaling. The sender could then receive a receipt or additional message that scaling was performed, among other things. In any event, notification can facilitate conversation by alerting communicating parties that the message received is not of the same as the message sent, consequently avoiding any confusion that may have otherwise occurred. To that end, an actual description of the scaling further helps. For example, a notification can indicate that a picture was removed and replaced with a URL and/or descriptive text.

Figure 2:
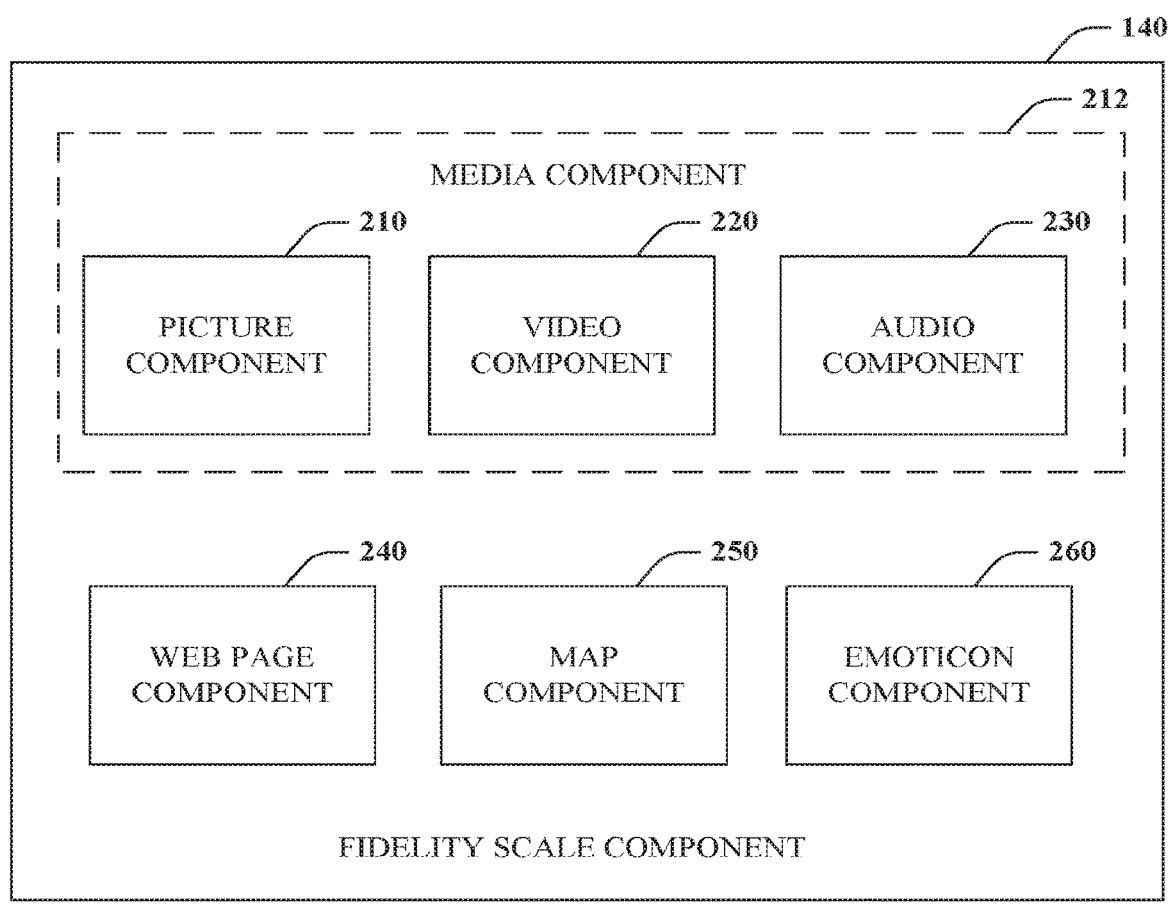
FIG. 2 is a block diagram of a representative scale component according to an aspect of the disclosure.

Turning attention to FIG. 2, a representative scale component 140 is illustrated in accordance with an aspect of the claimed subject matter. As shown, the scale component 140 includes a plurality of sub-components for processing various types, kinds, and/or categories of message content. In particular, the scale component includes picture component 210, video component 220, audio component 230, which can also simply be referred to as a media component 212, a webpage component 240, a map component 250, and emoticon component 260. Although not limited thereto, each of these components or subcomponents provides unique functionality with respect to scaling a specific type of message content. Further, the components can operate alone or in combination as will be described further infra.

Figure 3:
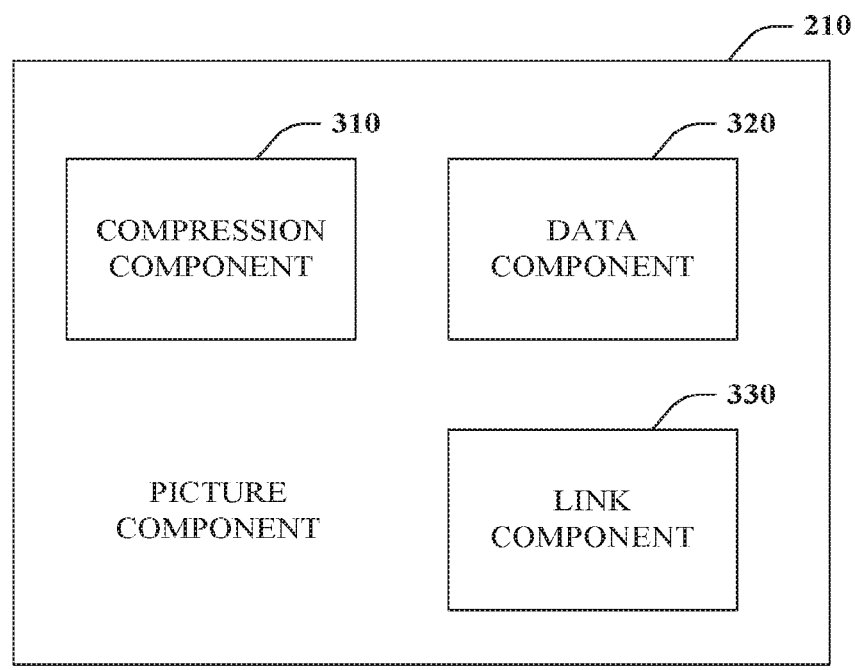
FIG. 3 is a block diagram of an exemplary picture component in accordance with a disclosed aspect.

Referring to FIG. 3, an exemplary picture component 210 is depicted in accordance with an aspect of the claimed subject matter. The picture component 210 can handle scaling with respect to various types of images or pictures embedded within a message. Compression component 310 is a mechanism for compressing or decompressing an image. Some messaging systems associated with devices can place limitation on the size of images. The compression component 310 can employ various known and/or novel compression/decompression technologies to enable size limitations to be respected, among other things. Data component 320 can extract and/or inject descriptive data associated with an image. For instance, a picture title and metadata associated with an image can be extracted and employed to describe an embedded picture where such picture is unable to be displayed based on message content limitations. Alternatively and where available, data can be injected, for example by adding or augmenting image metadata. Link component 330 is a mechanism for injecting and/or expanding URLs or other links to images. In one case, an image can be replaced with a URL where images are not supported. On the other hand, if a URL is embedded in a message sent to a device that supports images, the URL can be up scaled and the URL swapped with the image it identifies.

Figure 4:
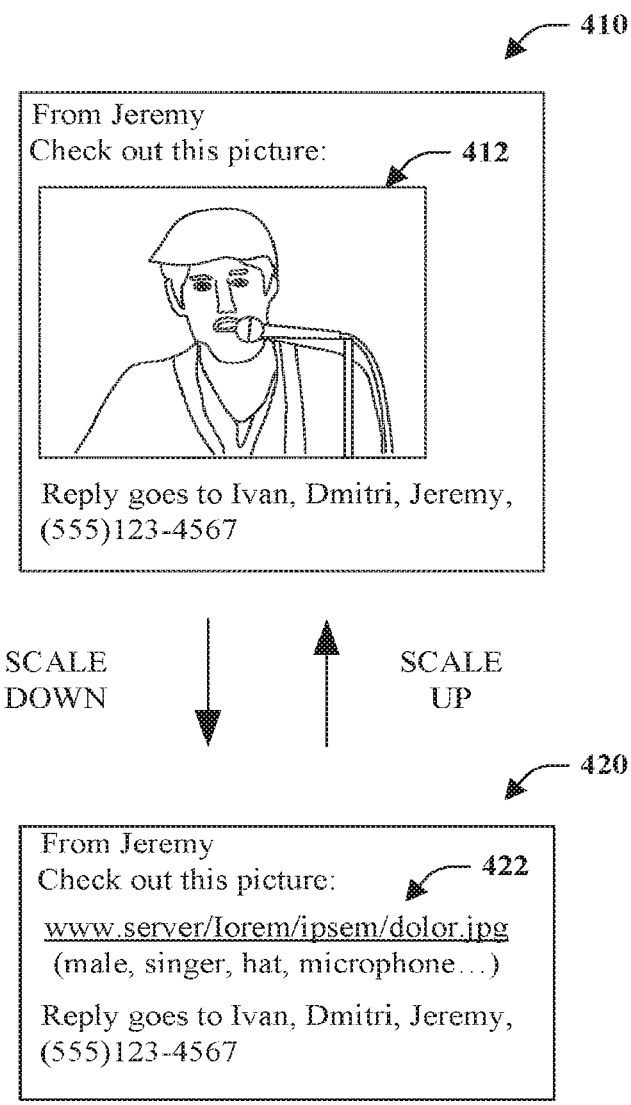
FIG. 4 is a graphical representation of picture scaling in accordance with a disclosed aspect.

FIG. 4 depicts an exemplary picture scaling according to a claimed aspect. Two messages 410 and 420 are shown. The message 410 includes an embedded picture 410. Where this is the message transmitted to a device that does not support pictures, the message can be scaled down to the message 420. Here, the picture is replaced with a URL that can be utilized to download or otherwise view the picture as well as some descriptive data associated with the image. By contrast, if the message 420 is transmitted from a device that does not support pictures to one that does, the message can be scaled up. In particular, a picture can be substituted for the link and/or descriptive text.

Figure 5:
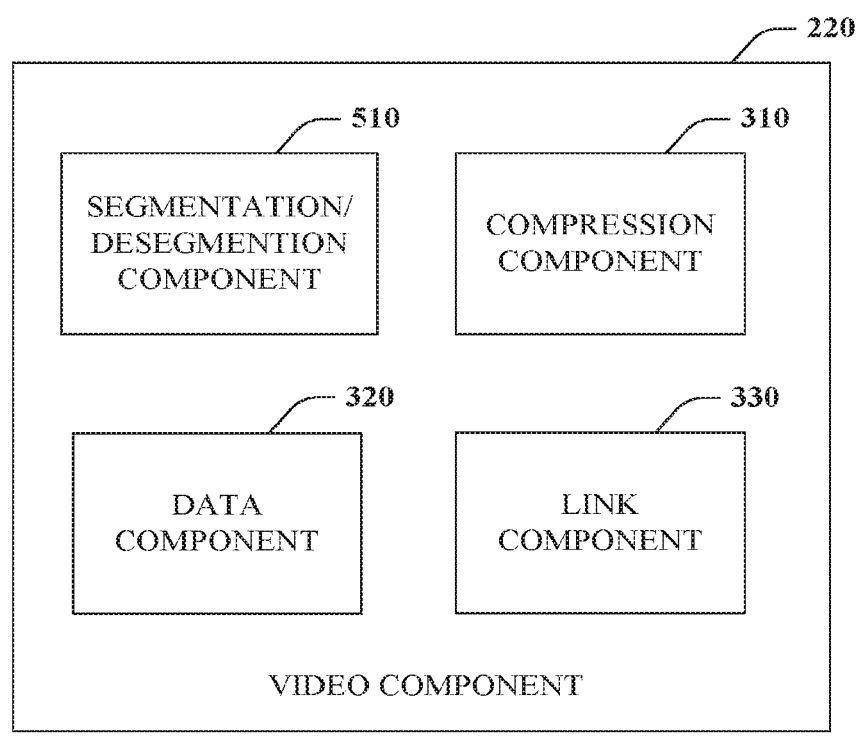
FIG. 5 is a block diagram of an exemplary video component according to an aspect of the disclosure.
Figure 6:
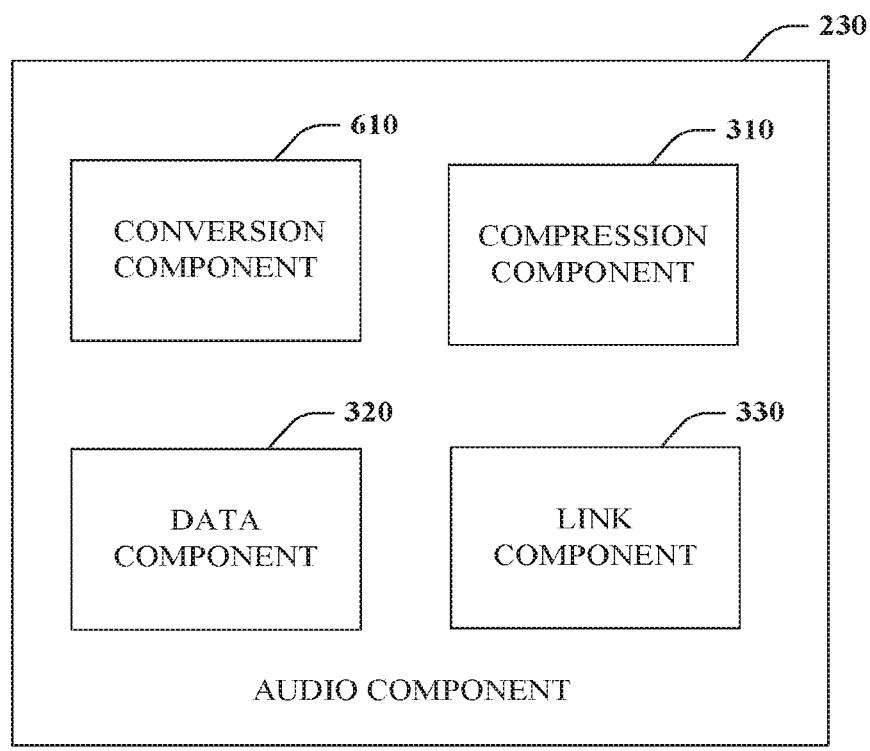
FIG. 6 is a block diagram of an exemplary audio component in accordance with a disclosed aspect.

Turning to FIG. 5, an exemplary video component 220 that scales message video content is illustrated in accordance with an aspect of the claimed subject matter. The video component includes a segmentation/de-segmentation component 510. The component 510 enables a video to be segmented or divided as well as de-segmented or combined. For example, a plurality of still images can be extracted from and employed to replace a video where pictures are supported but not videos. Similarly, audio can be removed from the video for separate transmission or in conjunction with a plurality of still images. Alternatively, audio can be recombined with still images, which can be merged in sequence to produce a video, slide show or the like.

Similar to the picture component 210, the video component 220 can also include analogous components such as compression component 310, data component 320, and link component 330. The compression component 310 can compress and decompress video to facilitate message communication with systems of with various video size constraints. The data component 320 can extract and combine text descriptive of a video. For example, metadata can be extracted from a video and utilized as a replacement or part of a replacement for a video. The link component 330 can facilitate replacement of a video with a link such as a URL or vice versa. For instance, rather than a video a link associated with the video can be employed where a messaging device does not support video. Of course, a message can also be up-scaled or enriched by substituting a video for a link thereto where a device supports video messaging.

Audio component 230 includes a conversion component 610, among other things, to convert audio to an appropriate form given messaging system and/or device constraints. In one embodiment, the conversion component 610 can employ known audio to text and/or text to audio technology. In this manner, if a message receiver does not support audio, text conversion of the audio can be employed to transforms an audio clip to text. In the context of up scaling rather than downscaling, audio conversion can be utilized to transform text to audio.

The audio component 230 also includes other analogous media components including compression component 310, data component 320, and link component 330. The compression component 310 can employ audio compression and decompression technologies aid scaling based on message size limitations. The data component 320 can operate to extract and inject data descriptive of a piece of audio. For example, a file title and associated metadata can be captured or introduce with respect to a particular audio clip or the like. The link component 330 enables a piece of audio be replaced by a link such as a URL to a source of the audio. In one instance, the link component 330 can facilitate storage of communicated audio and generating a reference thereto. Alternatively, the link component 330 can acquire a referenced piece of audio by following the link and embed the audio into a message instead of or in addition to the link.

Returning to FIG. 2, it is to be appreciated that all or some components comprising the media component 212, namely picture component 210, video component 220, and audio component 230, among other can interact to scale a message or message content. By way of example, not limitation, consider a scenario in which a sender includes a video in a message not supported by a receiver. The video component 220 can segment the media into visual and audio portions. The visual portions, which comprise a number of still images produced by the video component 220, can be further scaled using picture component 210 to compress the pictures, for instance. Further, the audio component 230 can transform the audio portion into text, which can then be associated with each related still image.

The fidelity scale component 140 can also include a number of other components that can use similar technology or techniques employed with respect to media component 212. In particular, the scale component 140 includes a web page component 240, map component 250, and emoticon component 260.

The web page component 240 enables scaling with respect to web pages, WAP (Wireless Application Protocol) pages, or the like embedded in a message. As per fidelity degradation, the web page component 240 can transform the page to an image of the page where image support is available. Additionally or alternatively, a link to the web page can be inserted to enable a user to access communicated content. Further yet, data and/or metadata can be extracted from the web page title, headers, and/or key words and provided as text. Of course, a message can be enriched when provided with of various forms by actually identifying a reference web page and embedding it within a message.

The map component 250 aids scaling of message maps. Since maps can be presented as web pages or images, among other things, along with text, many of the same techniques applied with respect to web page component 240 and picture component 210 can be applied. In one instance, compression can be applied to reduce the size of a map to allow the map to be communicated. A link such as a URL associated with a map can also be utilized in place of a map or in addition to an image of the map, for instance. Additionally or alternatively, information can be extracted from a map and utilized to provide descriptive text that captures the essence of the map such as an identified location and surrounding areas. Such information can be gathered from data associated with the map and/or from another source utilizing data forming part of the map to locate the data. In one particular instance, the map component 250 can communicate with mapping and/or GPS (Global Positioning System) applications to provide turn-by-turn directions from a device user's current position to a particular location identified on a map in text or some other form. Like other components of the scale component 140, the map component can be employed to enrich or degrade message content related to maps. Accordingly, note that the map component 250 can embed a map in a message in place of or in addition to other communication concerning a place or location. For example, where an address is sent via message to a recipient whose device supports embedded maps, a map of the location can be injected to facilitate communication.

The emoticon component 260 provides scaling of different types of emoticons, which provide a mechanism for expressing emotion, among other things. Emoticons can take various forms include text, graphical, and image based. Further, some emoticons can also include animation. Consequently, emoticon component 260 enables various kinds of emoticons to be replaced by others to facilitate communication in accordance with support provided therefor. For example, text or ASCII (American Standard Code for Information Interchange) emoticons (e.g., :-), :-( . . . ) can be replaced by graphical and/or image based representation where supported. Of course, where animated emoticons are employed other representations can be converted back and forth to enrich or degrade message content.

As previously mentioned, in accordance with an aspect of the claimed subject matter, the fidelity scale component 140 can be employed to facilitate communication by way of up scaling or down scaling message content to a supported level of message richness. While this can be performed automatically, it is also to be noted that user defined settings can affect scaling. For example, if a user has a preference for particular types of message such as text only, text and pictures, or text, pictures and video, amongst other combinations, despite messaging capabilities, scaling can be employed to implement those preferences. Furthermore, a device or other mechanism can influence scaling as a function of current processing load, memory constraints, and/or network latency, among other things.

Figure 7:
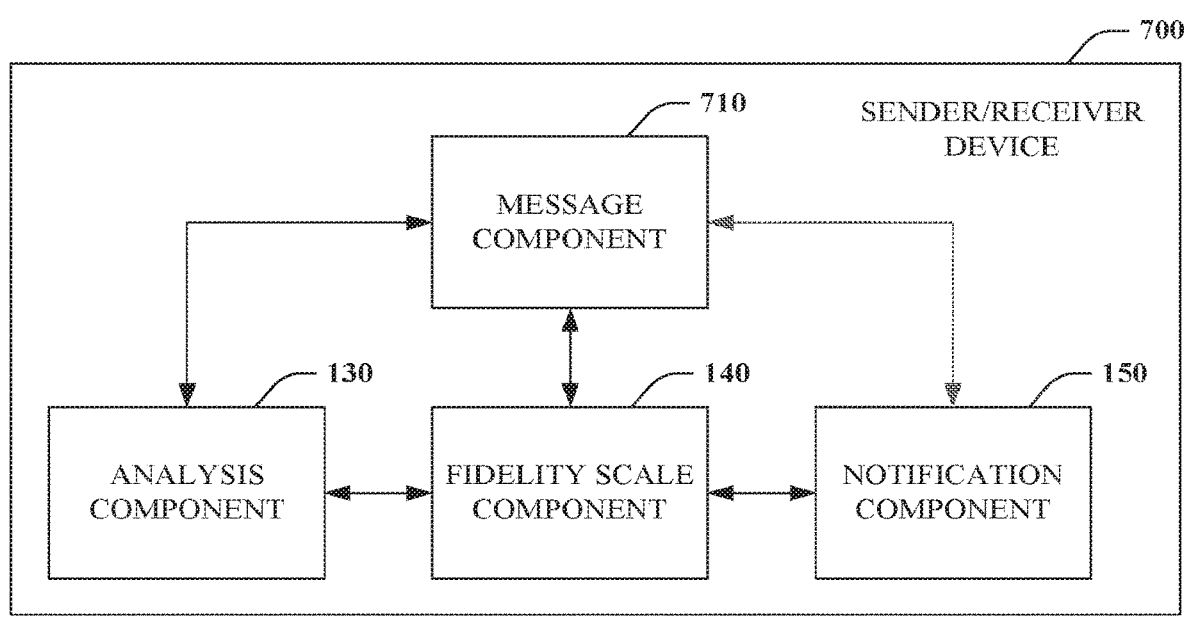
FIG. 7 is a block diagram of a sender/receiver device including fidelity scaling functionality according to an aspect of the disclosure.

While fidelity scaling can occur external to a device, for example on a server associated with a mobile device service provider, it is also to be appreciated that a sender/receiver device 700 can include such functionality as depicted in FIG. 7. Sender/receiver device 700 provides functionality for both sending and receiving communication at different times. The device 700 includes a message component 710 that provide functionality associated with composing, sending, and receiving messages, amongst other conventional functionality. The message component or system 710 can define message richness by supported functionality. Although not limited thereto, in accordance with one aspect the message component 710 can combine SMS, MMS, IM, and e-mail type features into a cohesive system that can transmit across SMS and IP backbones in a manner that is transparent or without observable effect to end users. The analysis component 130, fidelity scale component 140, and notification component 150, as previously described, are all communicatively and/or functionally coupled to the message component 710 to enable scaling of messages or message content in accordance with an aspect of the claimed subject matter. In brief, the analysis component 130 can analyze or otherwise determine the capabilities of a receiving device and/or the richness of an acquired message. The fidelity scale component 140 can then scale a message up or down to facilitate communication in connection with supported message richness or fidelity. The notification component 150 can transmit a notification or indication that a message has been scaled and optionally how or what effect the scaling had on the message to either or both of a sender and receiver via the message component 710, for example.

The aforementioned systems, devices, and the like have been described with respect to interaction between several components. It should be appreciated that such systems and components can include those components or sub-components specified therein, some of the specified components or sub-components, and/or additional components. Subcomponents could also be implemented as components communicatively coupled to other components rather than included within parent components. Further yet, one or more components and/or sub-components may be combined into a single component to provide aggregate functionality. Communication between systems, components and/or subcomponents can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the fidelity scale component 140, or one or more sub-components thereof, can employ such mechanisms to infer or otherwise determine an appropriate or intelligent manner and/or extent of scaling. For instance, these mechanisms can be employed to help generate descriptive text associated with media as a function of provided data or metadata and/or utilizing to help generate concise and meaningful summaries by way of pictures and/or text of message audio or video.

Figure 8:
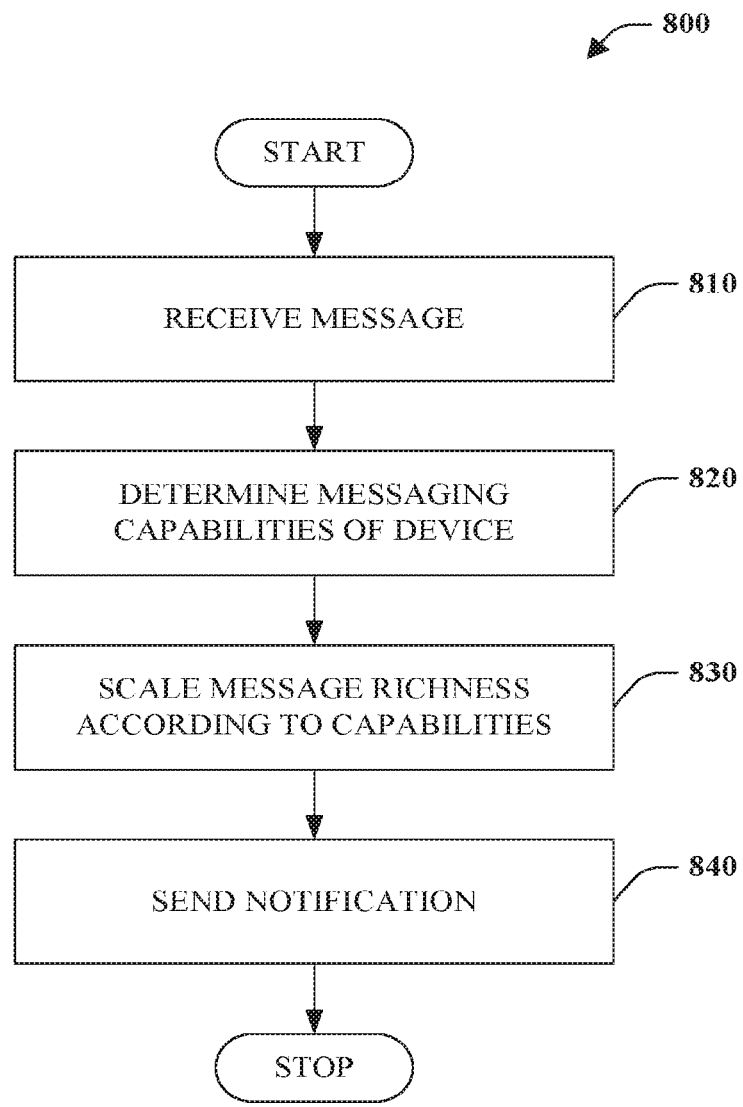
FIG. 8 is a flow chart diagram of a message scaling method in accordance with an aspect of the disclosed subject matter.
Figure 9:
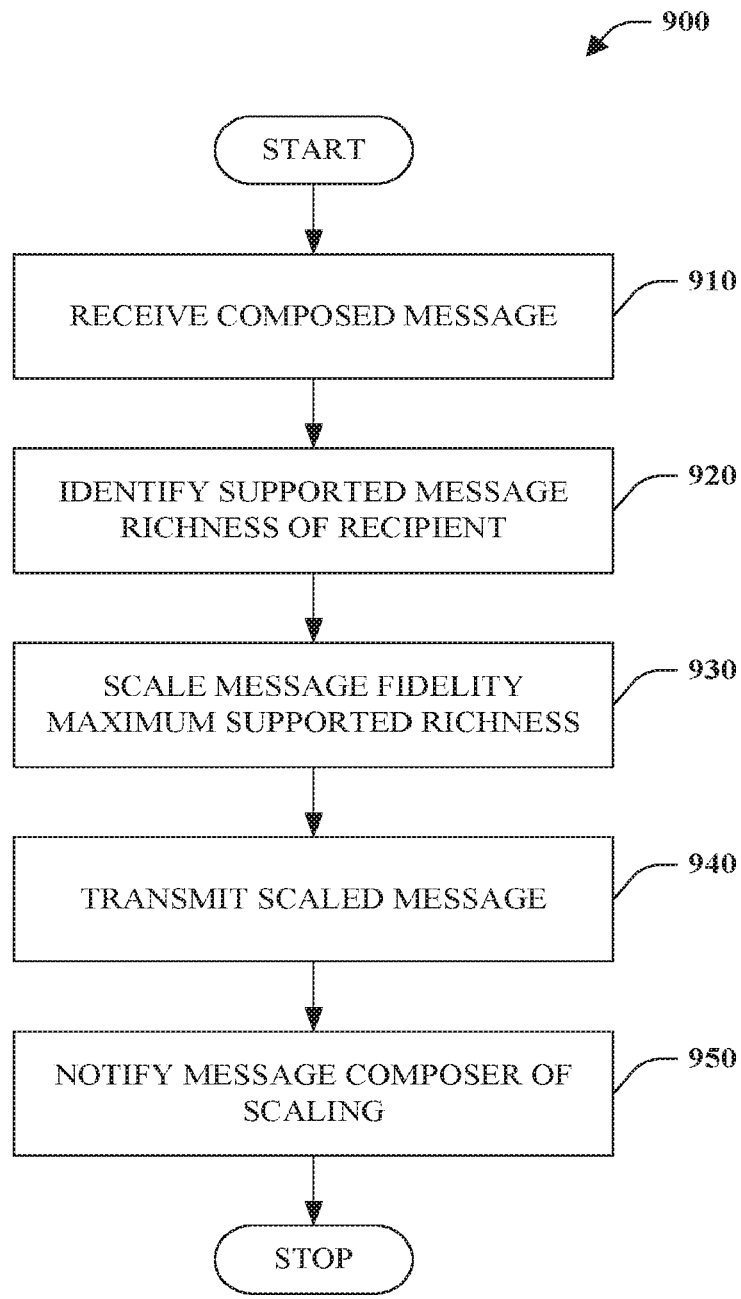
FIG. 9 is a flow chart diagram of a sender-side messaging method according to a disclosed aspect.
Figure 10:
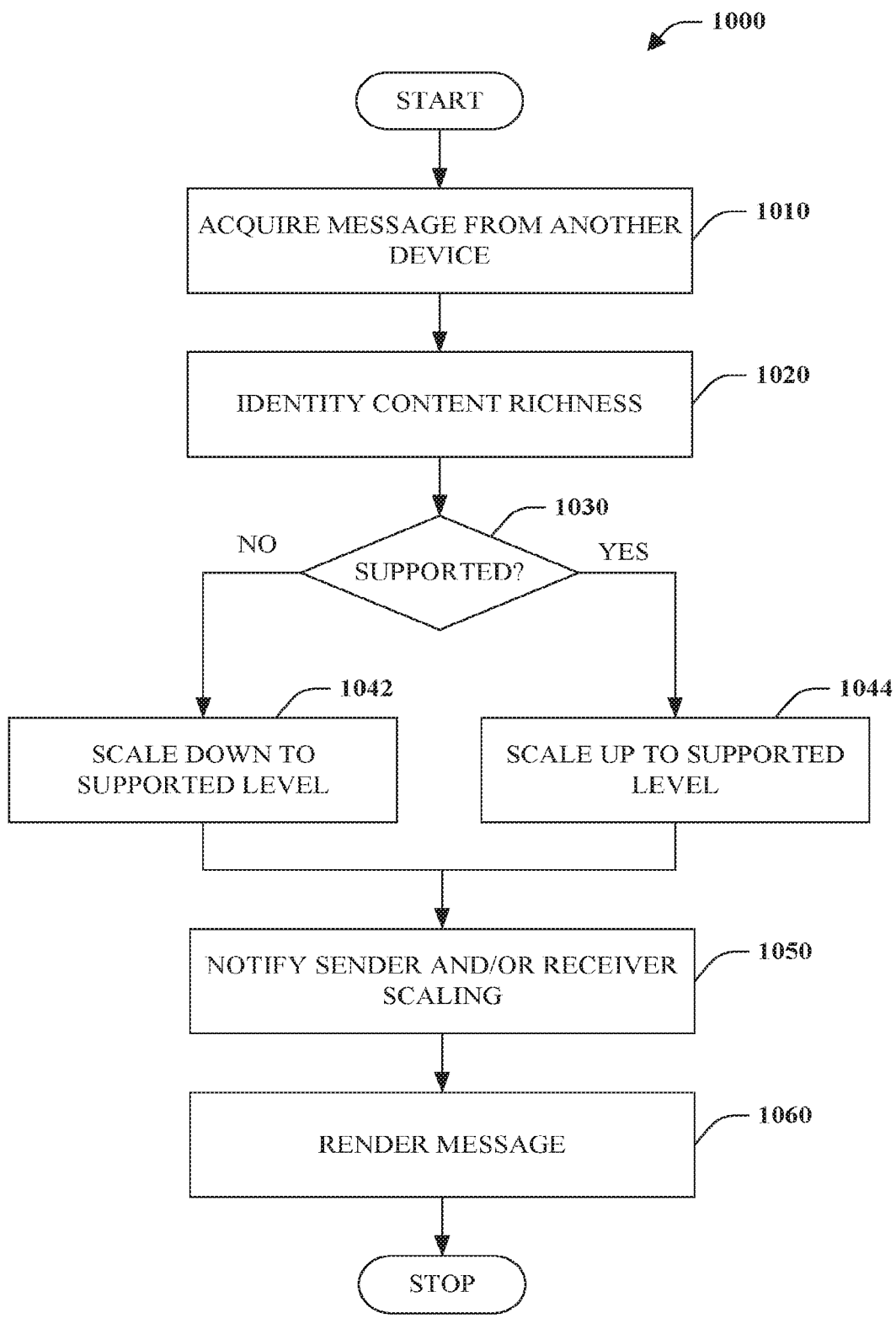
FIG. 10 is a flow chart diagram of a receiver-messaging method in accordance with an aspect of the disclosure.

In view of the exemplary systems described supra, methodologies that may be implemented in accordance with the disclosed subject matter will be better appreciated with reference to the flow charts of FIGS. 8-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 8, a message scaling method 800 is illustrated in accordance with an aspect of the claimed subject matter. At reference numeral 810, a message is received, retrieved, or otherwise identified. The message can correspond to an electronic threaded communication that is transmitted substantially instantaneously, for example in a manner analogous to SMS/MMS or IM. The message can include text, images, audio, video, web pages, maps, and/or emoticons, among other things. At numeral 820, the capabilities of a communication device are determined. The determination concerns the richness of messages or message content able to be processed. For example, support can be provided for one or more of text, images, audio, video, web pages, and maps, among other things. At reference 830, the message is scaled in accordance with capabilities of the device. In accordance with one aspect, the message can be scaled to the maximum fidelity enabled by the device. However, scaling can also be influenced by other factors including but not limited to user preferences. In addition, it is to be appreciated that scaling can operate to scale down or degrade a message, or scale up or enrich a message. Further yet, scaling can be down in an intelligent manner to facilitate communication. At reference 840, a notification is sent to a message sender and/or receiver indicating that the message has been altered and optionally how it was altered. Notification can be effected in a variety of different ways including but not limited to injected message text and/or a new message. Among other things, notification can facilitate conversation by alerting communicating parties that the message received is not of the same form as that sent thereby avoiding any confusion, for example.

While not limited thereto, in accordance with one aspect of the claimed subject matter, the method 800 can be performed on a server and/or in a distributed environment. For example, a server associated with a content or data service provider can acquire messages from sender devices, perform scaling in accordance with method 800, and subsequently transmit the scaled message as well as notification to a receiver device. Furthermore, scaling can be embodied as a network or web service employed by a device and/or content service provider.

FIG. 9 is a method of sender-side messaging 900 in accordance with an aspect of the claimed subject matter. At reference numeral 910, a composed message is received, retrieved, or otherwise acquired. At numeral 920, supported message richness or fidelity of a message recipient is identified, determined, inferred or the like. For example, the recipient device can communicate such information upon request or a sender can reference information stored about previous interactions with the same or like device. Further yet, a server and/or service can be contacted to aid identification of recipient capability.

At numeral 930, the composed message is scaled in accordance with the maximum level of fidelity supported by the recipient device. Of course, various preferences or other issues can affect the scaling such that the maximum is not always accomplished. Up or down scaling can be accomplished with respect to various types of message content including text, images, audio, video, web pages, maps, and/or emoticons among other things. Media can be scaled in similar manners such as via compression/decompression, descriptive data extraction/injection and link insertion and realization. Further, audio can be converted to text and video to still images or vice versa. Similar scaling can occur with respect to specific content such as web pages, which can be converted to images and optionally accompanied by descriptive data and a link, for example.

Subsequently, at numeral 940, scaled messages can be transmitted to a target receiver device. These scaled messages can correspond to actual transformation of the original message or generation of a new scaled version, among other things. At reference numeral 950, notification can be provided of the scaling. For instance, prior to transmitting the message such notification can be included with the scaled message. Further, the sender can also be notified to avoid confusion when a composed message is not communicated as composed but rather in a different form or format.

FIG. 10 illustrates a method of receiver-sent messaging 1000 in accordance with an aspect of the claimed subject matter. At reference numeral 1010, a message is received or acquired from another communication device. In accordance with one non-limiting embodiment, the message can be a thread style message where transmission and interaction are substantially instantaneous. In other words, the message can correspond to one or more variations of text messages or instant messages.

At numeral 1020, the message is analyzed to determine content richness or fidelity. Richness or lack thereof can be determined as a function of supported message content, among other things. For instance, a message that includes solely text is not as rich as one that also includes pictures. Similarly, a message that includes audio and video in addition to text and pictures is still richer yet. Accordingly, there is a level of content richness that can be associated with the received message.

A determination is made at reference 1030 as to whether the content is supported by the receiving device. In other words, the question is whether or not the device supports the at least the same level of richness as the message communicates. If it does not ("No"), the message can be scaled down to the level of richness or fidelity supported by the device at reference 1042. If at least the same level of richness is supported an attempt can be made to scale up the communicated message. If this is not possible or it is undesirable (e.g., based on user preferences), the method can simple pass through to 1060. Otherwise, the method continues at 1050.

At reference numeral 1050, a sender can be notified that their message was scaled by the receiver. Optionally, the style, kind or type, and extent of scaling can be communicated. For example, the notification can be "Recipient does not support audio accordingly the content was scaled to text" or "Recipient scaled up content from a URL to the image pointed to by the URL." Such notification can be communicated as part of a sent designated message perhaps sent and received behind the scenes or injected within a reply message, among other things.

At reference numeral 1060, the scaled message is rendered by the device and/or associated messaging component/system. Furthermore, it is to be appreciated that rending can include injection of a notification regarding scaling of the rendered message. Subsequently, the method can terminate.

As used in this application, the terms "component," "system," "device" and the like are intended to refer to a processor-based entity (e.g., computer, mobile communication device, . . . ), either hardware, a combination of hardware and software, software, or software in execution. For example, a component may be, but is not limited to being, a process running on a processor, a processor, an object, an instance, an executable, a thread of execution, a program, and/or a computer or other processor based device. By way of illustration, and not limitation, both an application running on a computer and the computer can be a component. One or more components can reside within a process and/or thread of execution and a component may be localized on one processor-based devices and/or distributed between two or more devices.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD)), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
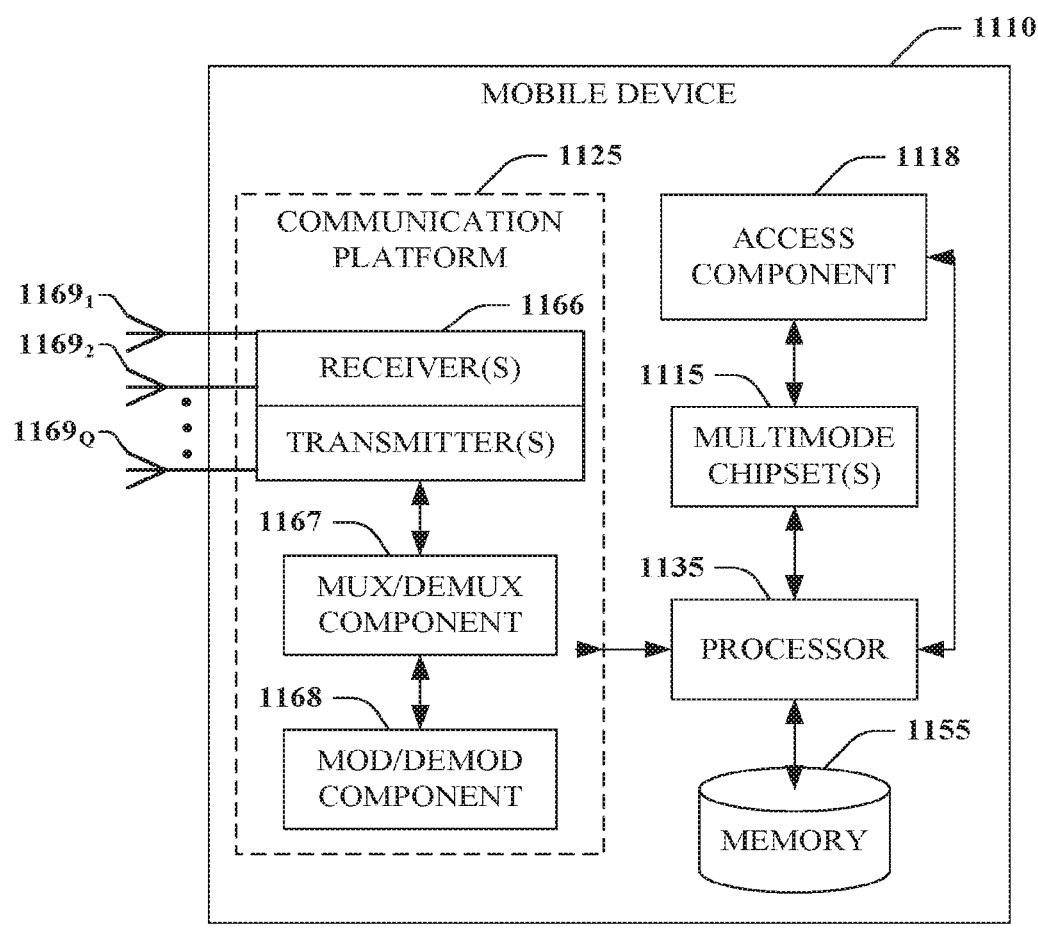
FIG. 11 is a schematic block diagram illustrating a suitable mobile operating environment for aspects of the subject disclosure.
Figure 12:
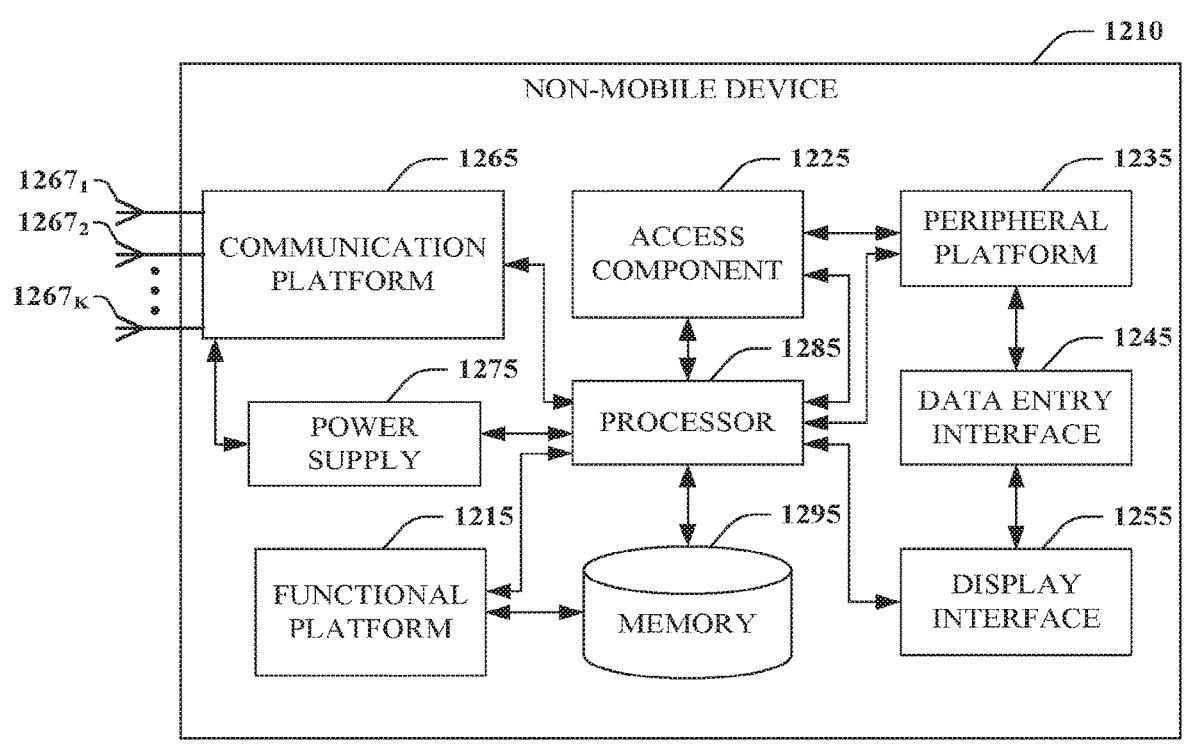
FIG. 12 is a schematic block diagram illustrating a suitable non-mobile operating environment for aspects of the subject disclosure.
Figure 13:
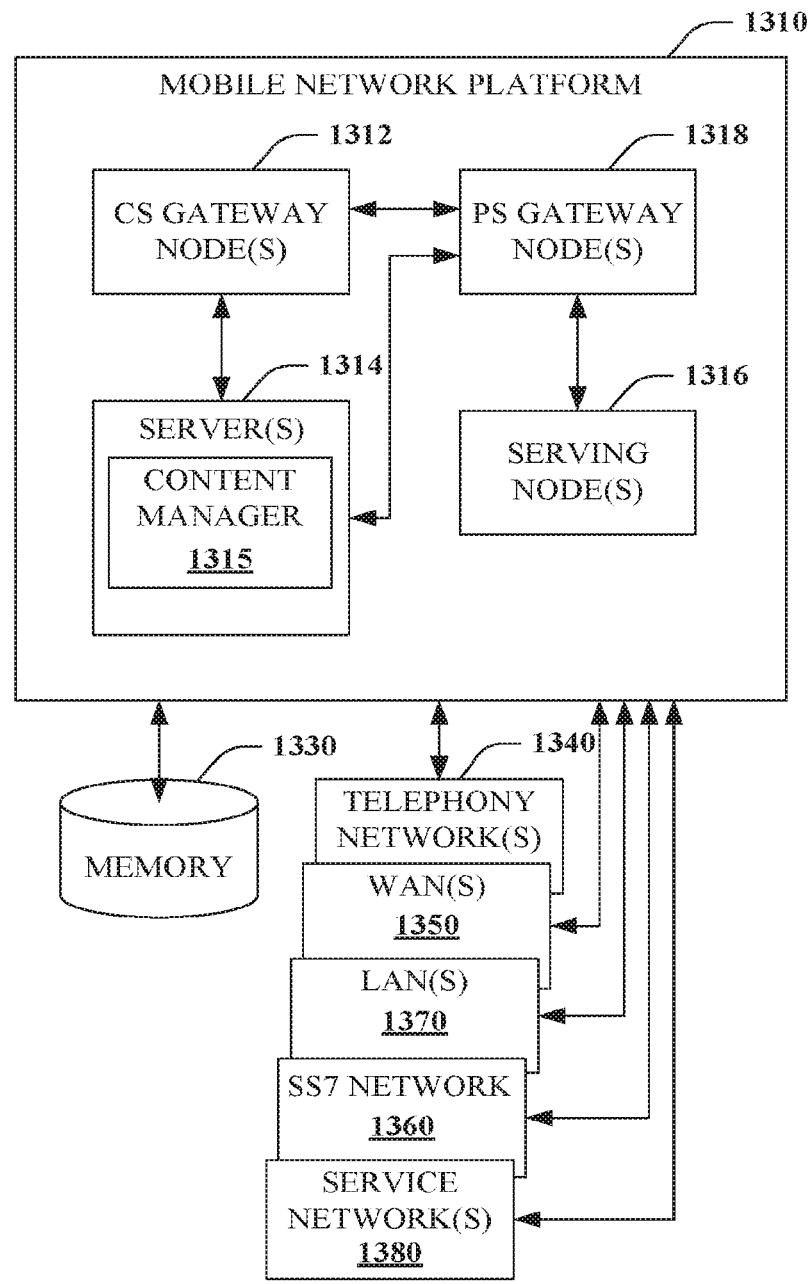
FIG. 13 is a schematic block diagram of a sample mobile network platform for aspects of the disclosed subject matter.

In order to provide a context for the various aspects of the disclosed subject matter, FIGS. 11-13 as well as the following discussion are intended to provide a brief, general description of suitable environments in which the various aspects of the disclosed subject matter can be implemented. FIG. 11 illustrates a block diagram of an example embodiment of a mobile device 1110 that can be employed with respect to fidelity scaling in accordance with aspects described herein. FIG. 12 presents a block diagram of an example embodiment of a non-mobile device 1105, which can be provisioned through a non-mobile network platform and employed in accordance with aspects described herein. Further, FIG. 12 presents an exemplary embodiment of a mobile network platform 1210 that can provide content management service in accordance with aspects described herein.

Mobile device 1110, which can be a multimode access terminal, includes a set of antennas 1169$_1$-1169$_Q$ (Q is a positive integer) that can receive and transmit signal(s) to and from wireless devices like access points, access terminals, wireless ports and routers, and so forth, that operate in a radio access network. It should be appreciated that antennas 1169$_1$-1169$_Q$ are a part of communication platform 1125, which comprises electronic components and associated circuitry that provide for processing and manipulation of received signal(s) and signal(s) to be transmitted such as receivers and transmitters 1166, mux/demux component 1167, and mod/demod component 1168.

Multimode operation chipset(s) 1115 allows mobile device 1110 to operate in multiple communication modes in accordance with disparate technical specification for wireless technologies. In accordance with one aspect, multimode operation chipset(s) 1115 utilize communication platform 1125 in accordance with a specific mode of operation (e.g., voice, Global Positioning System (GPS)). In another aspect, multimode operation chipset(s) 1115 can be scheduled to operate concurrently (e.g., when Q>1) in various modes or within a multitask paradigm.

Mobile device 1110 includes access component 1118 that can convey content(s) or signaling in accordance with disclosed aspects. It should be appreciated that access component 1118, can include a display interface that render content in accordance with aspects of an interface component (not shown) that resides within access component 1118.

Mobile device 1110 also includes a processor 1135 configured to confer functionality, at least in part, to substantially any electronic component within mobile device 1110, in accordance with aspects of the disclosure. As an example, processor 1135 can be configured to execute, at least in part, instructions in multimode operation chipset(s) that afford multimode communication through mobile device 1110 like concurrent or multi-task operation of two or more chipset(s). As another example, processor 1135 can aid mobile device 1110 in receiving and conveying signaling and content(s) (e.g., various data flows) that are part of an active management act initiated by a subscriber that operates mobile 1110, or an approval cycle associated with auxiliary subscribers (e.g., secondary subscriber, tertiary subscriber . . . ). Moreover, processor 1135 enables mobile device 1110 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 1155 can store data structures (e.g., metadata); code structure(s) (e.g., modules, objects, classes, procedures . . . ) or instructions; network or device information like policies and specifications, attachment protocols; code sequences for scrambling, spreading and pilot (e.g., reference signal(s)) transmission; frequency offsets, cell IDs, and so on.

The processor 1135 is functionally and/or communicatively coupled (e.g., through a memory bus) to memory 1155 in order to store and retrieve information necessary to operate and/or confer functionality, at least in part, to communication platform 1125, multimode operation chipset(s) 1115, access component 1118, and substantially any other operational aspects of multimode mobile 2010.

FIG. 12 is a block diagram of an exemplary embodiment of a non-mobile device 1210 that can convey content(s) and exploit various aspects of content transaction(s), among other things. Device 1210 includes a functional platform 1215 that comprises a set of components (not shown) that provide, at least in part, one or more specific functionalities of the non-mobile device 2110. Additionally, non-mobile device 2110 includes an access component 1225 that operates in accordance with aspects previously described (e.g., 1118 of FIG. 11). Moreover, in one aspect, non-mobile device 1210 can include a communication platform 1265 that can provide wireless communication capabilities in addition, or alternatively, to connectivity of non-mobile device 1210 through wired links (e.g., Ethernet, USB, GPIB, RS-232, Fire Wire, optical or coaxial cable connection to a network interface such as network interface 176, or router (not shown)). With respect to wireless capability, in non-mobile device 1210, which can be a multimode access terminal, a set of antennas $1267_1$-$1267_P$ (P is a positive integer) can receive and transmit signal(s) to and from wireless devices like access points, access terminals, wireless ports and routers, etc., that operate in a radio access network. Communication platform 1265 can exploit the set of "P" antennas $1267_1$-$1267_K$, (K is a positive integer) to establish communication within various modes such as single-input single-output, or multiple-input multiple output. Furthermore, communication platform 1265 can comprise various electronic components and associated circuitry that enable processing and manipulation of received signal(s) and signal(s) to be transmitted. In accordance with one aspect, the communication platform 1265 can be embodied in a modem.

Non-mobile device 1210 also includes a peripheral component 1235 that can include, or facilitate connection to, additional devices such as printer(s), media player(s), wireless router(s) (e.g., network interface), biometrics touch-pad(s), etc. According to one aspect, to afford such connectivity, peripheral component 1235 can include jacks for one or more of Ethernet, USB, GPIB, RS-232, Fire Wire, optical or coaxial cable connectors.

Display interface 1255 can enable rendering of content. In an aspect, display interface 1255 can be a liquid crystal display (LCD), a plasma panel, a monolithic thin-film based electrochromic display, amongst others. Additionally, display interface 1255 can be a part of functional platform 1215 (e.g., when non-mobile device 1210 is a PC, an IPTV (Internet Protocol TV) interface, a mobile device, a back projector component, a data projector . . . ).

It should be appreciated that non-mobile device 1210 also can include a data entry interface 1245 that can allow an end user to (i) command non-mobile device 1210 via configuration of functional platform 1215, (ii) deliver content(s) or signaling in accordance with aspects described herein, or (iii) generate content(s) (e.g., images via a built-in camera) or directive(s), among other things.

Power supply 1275 can power-up device 1210 and substantially any component included thereon. It should be appreciated that alternative or additional embodiments of device 1210 may not include power supply 1275 but rather be powered via attachment to a conventional power grid.

The non-mobile device 1210 includes processor 1285 which can be communicatively and/or functionally coupled (e.g., through a memory bus) to memory 1295 in order to store and retrieve information necessary to operate and/or confer functionality, at least in part, to access component 1225, and substantially any component(s) thereon in accordance with aspects described herein; functional platform 1215; communication platform 1265 when non-mobile device 1210 includes it; and substantially any other component of non-mobile device 1210. With respect to access component 1225, and components thereon, processor 1285 can be configured to execute access protocols to convey credentials and gains access to a content management service to convey multimedia content(s) or signaling, among other things. In addition, in connection with communication platform 1265, processor 1285 can be configured to confer functionality to substantially any electronic component within communication platform 1265. Moreover, processor 1285 enables communication platform 1265 to process traffic and control data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Memory 1295 can retain multimedia content(s), in accordance with aspects of the subject innovation, or security credentials (e.g., passwords, encryption keys, digital certificates . . . ) that facilitate access to a content management service. In addition, memory 1255 can store data structures (e.g., metadata); code structure(s) (e.g., modules, objects, classes, procedures . . . ) or instructions, or substantially any type of software or firmware that processor 1285 can execute to provide functionality associated with functional platform 1215; network or device information like policies and specifications; code sequences for scrambling, spreading and pilot (e.g., reference signal(s)) transmission; amongst others.

As indicate supra, FIG. 13 presents an example embodiment of a mobile network platform 1310 that can provide a content management service for content(s) and signaling in accordance with aspects described herein. Generally, mobile network platform 1310 can include components, such as, nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In accordance with one aspect, a component within a PS domain of network platform 1310 can be employed to effect communication among sources of content(s) in accordance with aspects described herein.

With respect to CS communication, mobile network platform 1310 includes CS gateway node(s) 1312 which can interface CS traffic received from legacy networks like telephony network(s) 1340 (e.g., public switched telephone network (PSTN), or public land mobile network (PLMN)) or a SS7 network 1360. Circuit switched gateway node(s) 1312 can authorize and authenticate traffic (e.g., voice) arising from such networks. Additionally, CS gateway node(s) 1312 can access mobility, or roaming, data generated through SS7 network 1360; for instance, mobility data stored in a visitation location register (VLR), which can reside in memory 1330. Moreover, CS gateway node(s) 1312 interfaces CS-based traffic and signaling and gateway node(s) 1318. As an example, in a 3GPP UMTS network, CS gateway node(s) 1312 can be embodied, at least in part, in gateway GPRS support node(s) (GGSN).

In addition to receiving and processing CS-switched traffic and signaling, PS gateway node(s) 1318 can authorize and authenticate PS-based data sessions with served mobile devices, non-mobile devices, amongst others through femto cell access points. Data sessions can include traffic, or content(s), exchange with networks external to the mobile network platform 1310, like wide area network(s) (WANs) 1350 or service network(s) 1380; it should be appreciated that local area network(s) (LANs) 1370 can also be interfaced with mobile network platform 1310 through PS gateway node(s) 1318.

Packet-switched gateway node(s) 1318 generate packet data contexts when a data session is established. To that end, in an aspect, PS gateway node(s) 1318 can include a tunnel interface (e.g., tunnel termination gateway (TTG) in 3GPP UMTS network(s) (not shown)) which can facilitate packetized communication with different wireless network(s), such as femto network platform and associated radio access network, Wi-Fi networks. It should be further appreciated that the packetized communication can include multiple flows that can be generated through service (e.g., provisioning) and application server(s) 1314. It is to be noted that in 3GPP UMTS network(s), PS gateway node(s) 1318 (e.g., GGSN) and tunnel interface (e.g., TTG) comprise a packet data gateway (PDG).

The mobile network platform 1310 also includes serving node(s) 1316 that convey various packetized flows of data streams, received through PS gateway node(s) 1318. As an example, in a 3GPP UMTS network, serving node(s) 1316 can be embodied in serving GPRS support node(s) (SGSN).

Server(s) 1314 in mobile network platform 1310 can execute numerous applications (e.g., location services, online gaming, wireless banking, wireless device management . . . ) that can generate multiple different packetized data streams or flows, and manage (e.g., schedule, queue, format . . . ) such flows. Such application(s), for example, can include add-on features to standard services provided by mobile network platform 1310. Data streams can be conveyed to PS gateway node(s) 1318 for authorization/authentication and initiation of a data session, and to serving node(s) 1316 for communication thereafter. It should be appreciated that PS gateway node(s) 1318 associated with a macro network platform can authorize, or grant access, to content management service, and PS gateway node(s) 1318 associated with a femto network platform can carry out communication with serving node(s) 1316 related to a femto network platform. Server(s) 1314 can also effect security (e.g., implement one or more firewalls) of mobile network platform 1310 to ensure network's operation and data integrity in addition to authorization and authentication procedures that CS gateway node(s) 1312 and PS gateway node(s) 1318 can enact. Moreover, server(s) 1314 can provision services from external network(s), such as WAN 1350 or Global Positioning System (GPS) network(s) (not shown). It is to be noted that server(s) 1314 can include one or more processors configured to confer at least in part the functionality of macro network platform 1310. To that end, the one or more processors can execute code instructions stored in memory 1330, for example. It is should be appreciated that server(s) 1314 can include a content manager 1315, that provides content management service. To at least that end, content manager 1315 includes issues subscription(s) to the content management service. Memory 1330 can store information related to operation of mobile network platform 1310. Information can include content(s) received from various sources of content(s), subscriber account(s) and associated credential(s), and delivery settings(s), additional subscriber data; pricing schemes, such as promotional rates, flat-rate programs, and/or couponing campaigns, amongst others. Memory 1330 can also store information from at least one of telephony network(s) 1340, WAN 1350, LAN 1370, SS7 network 1360, or service network(s) 1380.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A content scaling system in electronic communication with a content display component associated with an electronic consumer communication device, the content scaling system comprising:
   a processor; and
   a memory that stores executable instructions that, when executed by the processor, facilitate performance of operations, comprising:
   receiving content data;
   modifying the received content data to increase fidelity of the received content data, wherein the modifying comprises:

determining a fidelity target associated with an electronic consumer communication device;
accessing metadata associated with the received content data; and
based at least in part on the metadata and the fidelity target, generating scaled content data comprising data with higher fidelity than the received content data; and
transmitting the scaled content data to a content display component associated with the electronic consumer communication device.

2. The system of claim 1, wherein the operations further comprise:
accessing, from the electronic consumer communication device, data indicative of the device capability of the electronic consumer communication device.

3. The system of claim 2, wherein the fidelity target is associated with a device capability of the electronic consumer communication device.

4. The system of claim 1, wherein the operations further comprise:
determining the device capability of the electronic consumer communication device based at least in part on historical data indicative of one or more transmissions between the content scaling system and the electronic consumer communication device.

5. The system of claim 1, wherein the fidelity target is indicative of a maximum level of fidelity supported by the electronic consumer communication device.

6. The system of claim 1, wherein the received content data comprises video data, and wherein generating the scaled content data comprises increasing richness of the video data.

7. The system of claim 1, wherein modifying the received content data comprises:
accessing, from the memory, a user preference associated with the electronic consumer communication device;
determining an updated fidelity target associated with the electronic consumer communication device based at least in part on the user preference, wherein the updated fidelity target is different from the fidelity target;
generating updated scaled content data, wherein generating the updated scaled content data comprises updating fidelity of the received content data based at least in part on the updated fidelity target; and
transmitting the updated scaled content data to the content display component associated with the electronic consumer communication device.

8. The system of claim 1, wherein the content display component is electronically and locally connected to the electronic consumer communication device or the content display component is remotely and electronically connected to the electronic consumer communication device.

9. A method for content scaling, the method comprising:
receiving content data;
modifying the received content data to increase fidelity of the received content data, wherein the modifying comprises:
determining a fidelity target associated with an electronic consumer communication device;
accessing metadata associated with the received content data; and
based at least in part on the metadata and the fidelity target, generating scaled content data comprising data with higher fidelity than the received content data; and
transmitting the scaled content data to a content display component associated with an electronic consumer communication device.

10. The method of claim 9 further comprising:
accessing, from the electronic consumer communication device, data indicative of the device capability of the electronic consumer communication device.

11. The method of claim 10, wherein the fidelity target is associated with a device capability of the electronic consumer communication device.

12. The method of claim 9 further comprising:
determining the device capability of the electronic consumer communication device based at least in part on historical data indicative of one or more transmissions to the electronic consumer communication device.

13. The method of claim 9, wherein the fidelity target is indicative of a maximum level of fidelity supported by the electronic consumer communication device.

14. The method of claim 9, wherein the received content data comprises video data, and wherein generating the scaled content data comprises increasing richness of the video data.

15. The method of claim 9, wherein modifying the received content data comprises:
accessing a user preference associated with the electronic consumer communication device;
determining an updated fidelity target associated with the electronic consumer communication device based at least in part on the user preference, wherein the updated fidelity target is different from the fidelity target; and
generating updated scaled content data, wherein generating the updated scaled content data comprises updating fidelity of the received content data based at least in part on the updated fidelity target; and
transmitting the scaled content data to the content display component of the electronic consumer communication device.

16. The method of claim 9, wherein the content display component is electronically and locally connected to the electronic consumer communication device or the content display component is remotely and electronically connected to the electronic consumer communication device.

17. A non-transitory computer storage having stored thereon a computer program, the computer program including executable instructions that instruct a processor of a content scaling system to at least:
receive content data;
modify the received content data to increase fidelity of the received content data, wherein the modifying comprises:
determining a fidelity target associated with an electronic consumer communication device;
access metadata associated with the content data; and
based at least in part on the metadata and the fidelity target, generating scaled content data, wherein the scaled content data comprises data with higher fidelity than the received content data; and
transmitting the scaled content data to a content display component associated with an electronic consumer communication device.

18. The non-transitory computer storage of claim 16, wherein the executable instructions further instruct the computer processor to:
determine the device capability of the electronic consumer communication device based on historical data indicative of one or more transmissions to the electronic consumer communication device.

19. The non-transitory computer storage of claim 16, wherein the fidelity target is associated with a device capability of the electronic consumer communication device.

20. The non-transitory computer storage of claim 16, wherein the content display component is electronically and locally connected to the electronic consumer communication device or the content display component is remotely and electronically connected to the electronic consumer communication device.

\* \* \* \* \*